(12) United States Patent
Hahm et al.

(10) Patent No.: US 9,294,429 B2
(45) Date of Patent: Mar. 22, 2016

(54) METHOD AND SYSTEM FOR PROVIDING SERVICE FOR SEARCHING FRIENDS

(71) Applicant: SAMSUNG ELECTRONICS CO., LTD., Suwon-si (KR)

(72) Inventors: Seongil Hahm, Yongin-si (KR); Juyoun Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 13/863,866

(22) Filed: Apr. 16, 2013

(65) Prior Publication Data

US 2013/0275881 A1    Oct. 17, 2013

(30) Foreign Application Priority Data

Apr. 16, 2012  (KR) .................. 10-2012-0039343

(51) Int. Cl.
*H04L 29/06* (2006.01)
*H04L 9/32* (2006.01)
*H04K 1/00* (2006.01)
*H04L 9/08* (2006.01)
*H04L 12/58* (2006.01)
(Continued)

(52) U.S. Cl.
CPC ............. *H04L 51/32* (2013.01); *H04L 51/20* (2013.01); *G06F 2221/2111* (2013.01); *H04L 9/00* (2013.01); *H04L 9/08* (2013.01); *H04L 29/08657* (2013.01); *H04L 63/061* (2013.01); *H04L 63/08* (2013.01)

(58) Field of Classification Search
CPC ......... H04L 9/08; H04L 63/08; H04L 63/061; H04L 9/00; H04L 29/08657; G06F 2221/2111

USPC ........... 713/150, 168, 171; 380/255, 258, 278
See application file for complete search history.

(56) References Cited

U.S. PATENT DOCUMENTS

| 2003/0165239 A1 | 9/2003 | Bantz et al. |
| 2010/0169202 A1* | 7/2010 | Shnowske et al. .............. 705/35 |

(Continued)

FOREIGN PATENT DOCUMENTS

| EP | 1176840 A1 | 1/2002 |
| EP | 1691565 A1 | 8/2006 |

(Continued)

OTHER PUBLICATIONS

International Search Report (PCT/ISA/210) dated Aug. 23, 2013, issued by the International Searching Authority in International Application No. PCT/KR2013/003152.

(Continued)

*Primary Examiner* — Aravind Moorthy
(74) *Attorney, Agent, or Firm* — Sughrue Mion, PLLC

(57) ABSTRACT

A method of providing a friend search service of a portable terminal is provided. The method includes transmitting, by a first portable terminal, a message for controlling a microphone of a second portable terminal to a contact server through a cellular network, outputting a sound including a first encryption key after transmitting the message, receiving a second encryption key from the second portable terminal through the cellular network, checking the second portable terminals existing in a sound-reaching area by comparing the first encryption key with the second encryption key, and displaying a friends list including the second portable terminals existing in the sound-reaching area.

24 Claims, 16 Drawing Sheets

(51) Int. Cl.
*H04L 9/00* (2006.01)
*H04L 29/08* (2006.01)

(56) References Cited

U.S. PATENT DOCUMENTS

| | | |
|---|---|---|
| 2011/0070898 A1* | 3/2011 | Sanjeev et al. ............. 455/456.2 |
| 2011/0207406 A1 | 8/2011 | Pan |
| 2012/0045994 A1 | 2/2012 | Koh et al. |
| 2012/0064881 A1 | 3/2012 | Svendsen |
| 2012/0088524 A1 | 4/2012 | Moldavsky et al. |
| 2014/0106710 A1* | 4/2014 | Rodriguez ................... 455/411 |

FOREIGN PATENT DOCUMENTS

| | | |
|---|---|---|
| KR | 2005-0048936 A | 5/2005 |
| KR | 2006-0031475 A | 4/2006 |

OTHER PUBLICATIONS

Communication dated Nov. 4, 2015, issued by the European Patent Office in counterpart European Application No. 13778109.2.

* cited by examiner

METHOD AND SYSTEM FOR PROVIDING SERVICE FOR SEARCHING FRIENDS

PRIORITY

This application claims priority from Korean Patent Application No. 10-2012-0039343, filed on Apr. 16, 2012 in the Korean Intellectual Property Office, the entire disclosure of which is hereby incorporated by reference.

BACKGROUND

1. Field

Methods and systems consistent with exemplary embodiments relate to a method and system for providing a service for searching for friends, and more particularly, to a method and system for providing a searching capability for friends capable of being searched for and providing one or more friends existing in a position adjacent to a user using the friend search service.

2. Description of the Related Art

Recently, along with the development of digital technologies, portable terminals allowing communication and processing of personal information while moving, such as a mobile communication terminal, a personal digital assistant, an electronic organizer, a smart phone, a tablet personal computer (PC), etc., are being variously introduced. Such portable terminals do not remain in their traditional unique areas, but are reaching a mobile convergence phase covering the areas of other terminals. For example, a portable terminal may have various functions such as a voice call, a video call, a short message service (SMS), a multimedia message service (MMS), an electronic organizer, photographing, e-mail transmission/reception, a broadcast replay, a video file replay, Internet, electronic commerce, a music replay, schedule management, a social network service (SNS), a friend search service, a messenger, a dictionary, and a game.

In particular, the friend search service of searching for the position of others is a service which is recently drawing people's attention. The friend search service is a location-based service, and the conventional location-based service obtains location information of a portable terminal using a location detection technology (LDT) based on the communication network, and is a service that provides various services to the portable terminal based on the obtained location information.

However, the conventional location-based service allows a one-to one search service to only the users who use the same service (e.g., a friend search service) and have completed the authentication procedure for location checking between users, and registration between the users. Hence, according to the conventional location-based service, it is difficult for a user to check the locations of one or more friends existing in an area adjacent to the user.

SUMMARY

Exemplary embodiments have been made in view of the above problems, and an object of exemplary embodiments is to provide a method and system for providing a friend search service capable of simply searching for and connecting to another user existing in a location adjacent to the location of portable terminal user.

Another object of an exemplary embodiment is to provide a method and system for providing a friend search service capable of searching for and connecting to one or more users existing in a location adjacent to the location of user by utilizing a sound outputted in a portable terminal.

Another object of an exemplary embodiment is to provide a method and system for providing a friend search service capable of improving a user's convenience, portable terminal's usability, and portable terminal's competitiveness by implementing an optimal environment for supporting a friend search service in a portable terminal.

In accordance with an aspect of an exemplary embodiment, a method of providing a friend search service of a terminal comprises: transmitting, by a first terminal, a message for controlling a microphone of a second terminal to a server through a network; outputting a sound including a first encryption key after transmitting the message; receiving a second encryption key from the second terminal through the network; checking second terminals existing in a sound-reaching area by comparing the first encryption key with the second encryption key; and displaying a friends list including second terminals existing in the sound-reaching area.

In accordance with another aspect of an exemplary embodiment, a method of providing a friend search service of a terminal comprises: receiving, by a second terminal, a message for controlling a microphone from a contact server through a network; turning on the microphone of the second terminal in response to the message; receiving a sound outputted by a first terminal through the microphone; obtaining an encryption key from the sound; and transmitting the encryption key to the first terminal through the network.

In accordance with another aspect of an exemplary embodiment, a method of providing a friend search service of a server comprises: constituting a friends list of a first terminal in response to execution of a friend search service of the first terminal; generating a message for controlling a turning-on of a microphone of a second terminal corresponding to the friends list; pushing the message to the second terminal through a network; receiving an encryption key through the network from the second portable terminal having received the message; and transmitting the encryption key to the first terminal through the network.

In accordance with another aspect of an exemplary embodiment, a computer-readable recording medium records a program for executing the above method in a processor.

In accordance with another aspect of an exemplary embodiment, a system for providing a friend search service comprises: a first terminal for transmitting a message for a turn-on control of a microphone of at least one second terminal, outputting a sound including an encryption key through a speaker, and providing a feedback of a list of friends in an adjacent area based on the second receiving the sound and transmitting the encryption key, in response to execution of the friend search service; and the second terminal for turning on the microphone, obtaining the encryption key from the sound when the sound outputted by the first terminal is received through the microphone, and transmitting the encryption key to the first terminal and indicating existence in an area adjacent to the first terminal, in response a message transmitted from the first terminal.

The system may include a contact server for distinguishing the second terminal related with the first terminal in response to execution of the friend search service of the first terminal, pushing the message for a turn-on control of the microphone to the second terminal, and transmitting the encryption key transmitted by the second terminal to the first terminal in response to the message. Further, the system may further include a network and a push server.

The first terminal may comprise: a wireless communication unit for transmitting the message to the second terminal, and receiving the encryption key transmitted by the second terminal; the speaker for outputting the sound including the encryption key to a preset output intensity; a display unit for dividing the friends list of the second terminal existing in an area adjacent to the first terminal, and displaying the friends list; and a controller for controlling to transmit the message for a turn-on control of the microphone of the second terminal, controlling to output the sound including the encryption key, checking the second terminal existing in an adjacent area through comparing the encryption key received from the second terminal with the encryption key transmitted through the sound, and controlling to divide the friends list based on the second terminal by distances and display the friends list.

The second terminal may comprise: a wireless communication unit for receiving the message, and transmitting the encryption key obtained from the sound to the first terminal; the microphone for receiving the sound outputted by the first terminal; and a controller for controlling a turn-on of the microphone when the message is received, and controlling to extract the encryption key from the sound inputted through the microphone and transmit the extracted encryption key to the first terminal.

In accordance with another aspect of an exemplary embodiment, a device includes: a storage unit which stores at least one program; and a controller configured to control a first terminal to search for a second terminal by executing the at least one program, wherein the at least one program includes commands for executing the operations: transmitting, by the first terminal, a message for controlling a microphone of the second terminal to a contact server through a network; outputting a sound including a first encryption key after transmitting the message; receiving a second encryption key through the network from the second terminal; checking the second terminal existing in a sound-reaching area by comparing the first encryption key with the second encryption key; and displaying a friends list including the second terminal existing in the sound-reaching area.

In accordance with another aspect of an exemplary embodiment, a device includes a storage which stores at least one program; and a controller configured to control a first terminal to search for a second terminal by executing the at least one program, wherein the at least one program includes commands for executing the operations: receiving, by a second terminal, a message for controlling a microphone from a server through a network in a push scheme; turning on the microphone of the second terminal in response to the message; receiving a sound outputted by the first terminal through the microphone; obtaining an encryption key from the sound; and transmitting the encryption key to the first terminal through the network.

In accordance with another aspect of an exemplary embodiment, a computer-readable recording medium records a program for outputting a sound including an encryption key through a speaker when executing a friend search service, identifying a friend in a sound-reaching area based on a terminal responding to the sound and providing a feedback to a user, receiving the sound outputted from the speaker through a microphone, and informing of existence in a sound-reaching area by transmitting the encryption key obtained from the sound.

As described above, according to a method and system for providing a friend search service, a user may easily recognize one or more other users adjacent to the user's current location by a simple operation. According to an exemplary embodiment, a user may simply search for other users located adjacent to the user's location, and share user's data with the searched users by data transmission (or streaming).

According to an exemplary embodiment, a terminal may automatically search for friends adjacent to a user and inform the user of the searched friends in response to the user's request, and the user may easily recognize other users adjacent to the user himself by a simple terminal operation even while using the terminal.

Further, according to an exemplary embodiment, a search of other users unrelated with the user is presented and thus wrong data sharing with unrelated other users may be prevented by providing strong security through transmission and reception of an encryption key (a random number) for authentication of other users related with the user when providing an adjacent friend search service.

The terminals may be portable, and the messages may be push messages.

Also, the constituting the friends list mentioned above may be based on identification information related to the first terminal. The identification information may be registered in a server.

Further, exemplary embodiments may be implemented in all forms of terminals and other devices corresponding thereto. Further, according to an exemplary embodiment, an optimal environment for searching for friends adjacent to a terminal user is implemented, thereby contributing to improvement of usability, convenience and competitiveness of a terminal.

BRIEF DESCRIPTION OF THE DRAWINGS

The objects, features and advantages of exemplary embodiments will be more apparent from the following detailed description in conjunction with the accompanying drawings, in which.

DETAILED DESCRIPTION OF EXEMPLARY EMBODIMENTS

Figure 1:
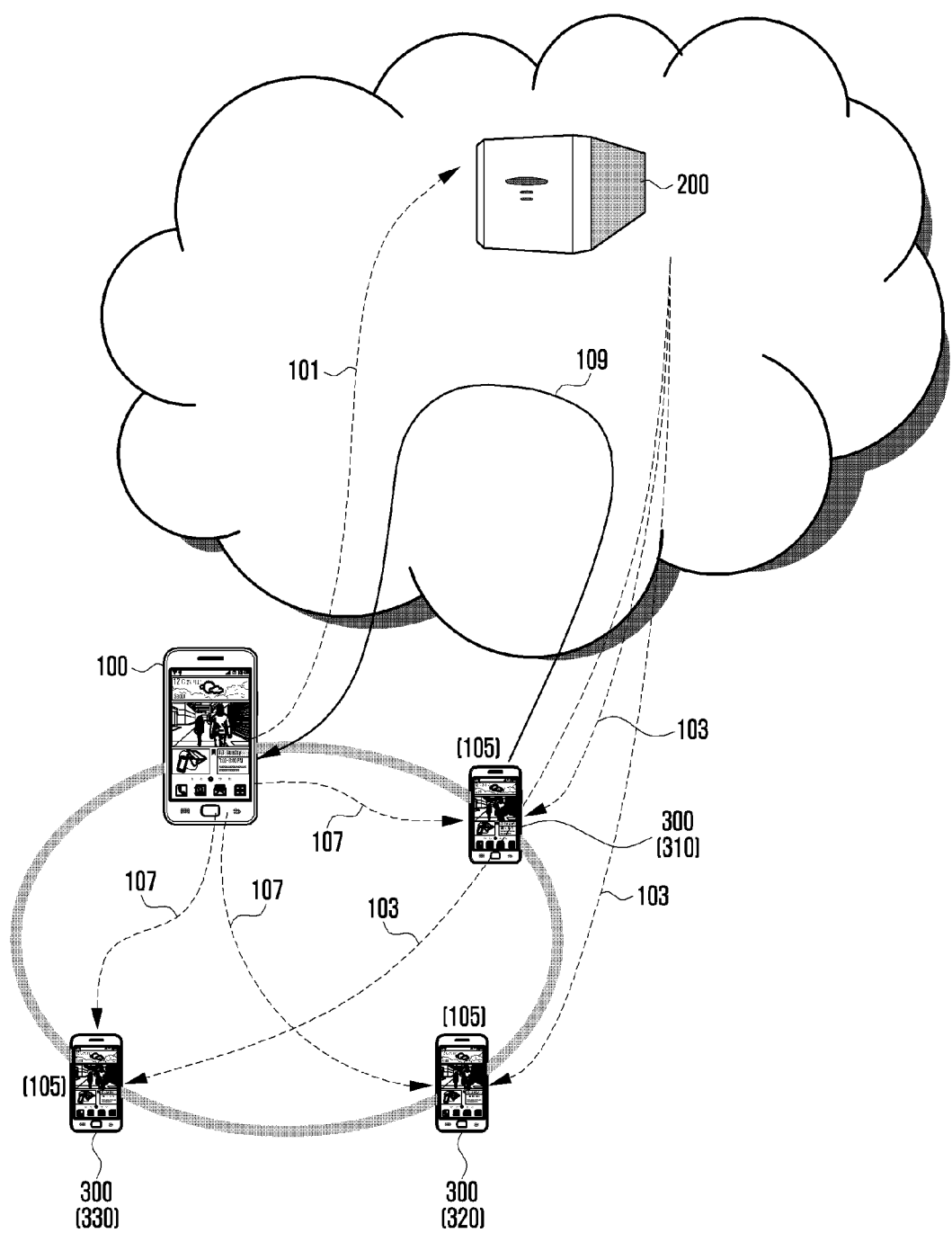
FIG. 1 schematically illustrates a system for describing an operation of supporting a friend search service according to an exemplary embodiment.

Exemplary embodiments are described with reference to the accompanying drawings in detail. Exemplary embodiments relate to a method and system for providing a friend search service, and more particularly, to a method and system for providing a friend search service capable of searching for friends adjacent to portable terminal user, and intuitively displaying locations of searched adjacent friends.

According to the exemplary embodiments, when a sending portable terminal initiates a friend search service, a sound including an encryption key generated in the sending portable terminal may be transmitted to a receiving portable terminal of a user (e.g., a friend) related with user of the sending portable terminal. When the encryption key is obtained through the received sound, the receiving portable terminal may transmit the obtained encryption key to the sending portable terminal. Then the sending portable terminal may authenticate the generated encryption key and the encryption key transmitted by the receiving portable terminal, and give feedback to a user through a given user interface (UI) or graphic user interface (GUI) based on information on the authenticated receiving portable terminal. In an exemplary embodiment, the sound includes an audible frequency or sound waves, and is referred to as "sound".

As such, a user of the sending portable terminal may easily recognize friends adjacent to the current location of the user among users related with the user, and may share various data used by the user according a user's selection. In an exemplary embodiment, data include all forms of contents displayed or stored in a portable terminal as well as music, an electronic document, a picture, a moving picture, a web document and a digital broadcast. In an exemplary embodiment, sharing refers to transmitting data to one or more other portable terminals, and may include streaming transmission.

Further, in an exemplary embodiment, another user refers to a user having a certain relationship (a relationship according to a user setting of a portable terminal) with the user, such as a friend, an acquaintance, a fellow, etc. of the portable terminal user, and the friends list refers to a list of other users having a certain relationship with the portable terminal user.

Further, in an exemplary embodiment, the portable terminal may include at least one of cellular networks, that is, a wireless communication interface for a mobile communication network, and a wireless local area network (LAN) communication interface for a wireless LAN. In an exemplary embodiment, various networks such as a 2nd generation (2G), 3rd generation (3G), 4th generation (4G), wideband code division multiple access (WCDMA) and a global system for mobile communications (GSM), etc. may be utilized as cellular networks, but the present invention is not limited to these examples.

Hereinafter, a configuration of a system and portable terminal according to an exemplary embodiment and the method of controlling the operation thereof will be described with reference to the attached drawings. The configuration of a system and portable terminal according to an exemplary embodiment and the method of controlling an operation thereof are limited to the description below, and may be applied to various other exemplary embodiments.

FIG. 1 schematically illustrates a system for describing an operation of supporting a friend search service according to an exemplary embodiment.

As illustrated in FIG. 1, a system includes a first sending portable terminal 100 for requesting a friend search service, a contact server 200, and one or more second portable terminals 300 (310, 320 and 330) for responding to the friend search service request.

In response to the user request, the first portable terminal 100 may generate a location check message for a search of friends existing near the first portable terminal 100, and transmit the message to the contact server 200. Further, after transmitting the location check message, the first portable terminal 100 may generate an encryption key (e.g., a random number) for authentication, and load the generated encryption key in a sound and output the sound through a speaker. At this time, the encryption key may be automatically generated by the first portable terminal 100 in a random manner, may be manually generated by user's random input, or may be generated based on the table of random numbers stored in advance.

Further, when receiving an encryption key transmitted by the second portable terminal 300 through the contact server 200, the first portable terminal 100 may compare the received encryption key with the encryption key generated by the first portable terminal 100 itself. The first portable terminal 100 may confirm the second portable terminal 300 existing in an area adjacent to the first portable terminal 100 through the comparison of the encryption key. Further, it is possible to be provided, at the first portable terminal 100, to a user through a user interface (UI) or graphical user interface (GUI) related to the second portable terminal 300 existing in an adjacent area.

In an exemplary embodiment, the adjacent area refers to a distance (or a reaching range), by which the sound outputted by the first portable terminal 100 may reach, on the basis of the first portable terminal 100, and may be changed according to a user's setting. That is, the default value of the reaching distance of the sound may be set when the portable terminal is manufactured, and may be changed according to the user's setting. For example, the reaching distance may be set as various values such as 5 m, 25 m, 50 m, 100 m, etc.

At this time, when the reaching distance is set, the portable terminal may set the sound output intensity through the speaker according to the set reaching distance, and control an output according to the determined output intensity.

For example, the output intensity for the reaching distance 5 m may be set as "A", the output intensity for the reaching distance 25 m may be set as "B", and the output intensity for the reaching distance 50 m may be set as "C", and the output distance "D" for the reaching distance 100 m may be set as "D". Here, the output intensities "A", "B", "C" and "D" denote values that determine the speaker output intensity of the portable terminal, and the output intensity may increase as the reaching distance gets greater. That is, in the above example, the output intensities "A", "B", "C" and "D" may be defined as "A<B<C<D".

When receiving the location check message for a friend search request from the first portable terminal 100, the contact server 200 may generate a signal cast by the first portable terminal 100 (e.g., a push message of requesting a receiving standby of a sound including an encryption key), and transmit the message to the second portable terminal 300 (portable terminals of one or more users having a certain relationship with the user of the first portable terminal 100). Further, when the message including the encryption key is received from the second portable terminal, the contact server 200 transmits the received message to the first portable terminal 100.

Further, in an exemplary embodiment, the contact server 200 has been set to include one server, but it is possible for the contact server 200 to separately include a push server (not shown). For example, if the location check message is received from the first portable terminal 100, the contact server 200 may request transmission of a push message to the push server or one or more second portable terminals 300. Then the push server may generate the push message, and transmit the generated message to one or more second portable terminals 300 in a push scheme.

When the push message is received from the contact server 200, the second portable terminal 300 may turn on the microphone in response to the push message, and wait for the reception of a sound transmitted by the first portable terminal 100. Further, if a sound outputted by the first portable terminal 100 is inputted through the microphone, the second portable terminal 300 may extract an encryption key included in the sound, and transmit the extracted encryption key to the contact server 200. FIG. 1 illustrates that the encryption key is transmitted through the contact server 200, but is also obvious to those skilled in the art that the encryption key may be transmitted through the cellular network.

Referring to the operation example of the exemplary embodiment with reference to FIG. 1, a user may desire to check the locations of friends adjacent to a user, or cast multimedia data to the adjacent friends while viewing and/or listening to multimedia data (e.g., music, a document, a picture, a moving picture, etc.) in the portable terminal 100. The user may execute a friend search application using the first portable terminal 100. That is, the first user desiring to find friends existing in an area adjacent to the location of user transmits the location check message to the contact server using its own first portable terminal 100 (101).

When the location check message is received from the first portable terminal 100, the contact server 200 generates a push message, and transmits the push message to the second portable terminals 300 of one or more second users (e.g., friends) related with the user of the first portable terminal 100 (103). Further, in response to the push message, the second portable terminal 300, which receives the push message from the contact server 200, is converted into the wake-up state, turns on the microphone, and waits for the signal (the sound outputted by the first portable terminal) cast by the first portable terminal 100 (105).

The first portable terminal 100 transmits the location check message, generates an encryption key (e.g., a random number) for authentication with other portable terminals existing in an adjacent area, loads the encryption key in a sound, and outputs the sound through the speaker (107).

The second portable terminal 300 may receive the sound outputted by the first portable terminal 100 through the turned-on microphone, decode and obtain the encryption key included in the sound. Further, the second portable terminal 300 transmits the obtained encryption key to the first portable terminal 100 through the contact server 200 (109).

If the encryption key is received from the second portable terminal 300 through the contact server 200, the first portable terminal 100 may compare the received encryption key with the encryption key generated by the first portable terminal and outputted through the sound, and determine the second portable terminal 300 having transmitted the coincided encryption key as a portable terminal existing in an adjacent area. Further, the first portable terminal 100 may generate the list of friends based on the determined portable terminal information and provide a feedback to user.

Figure 2:
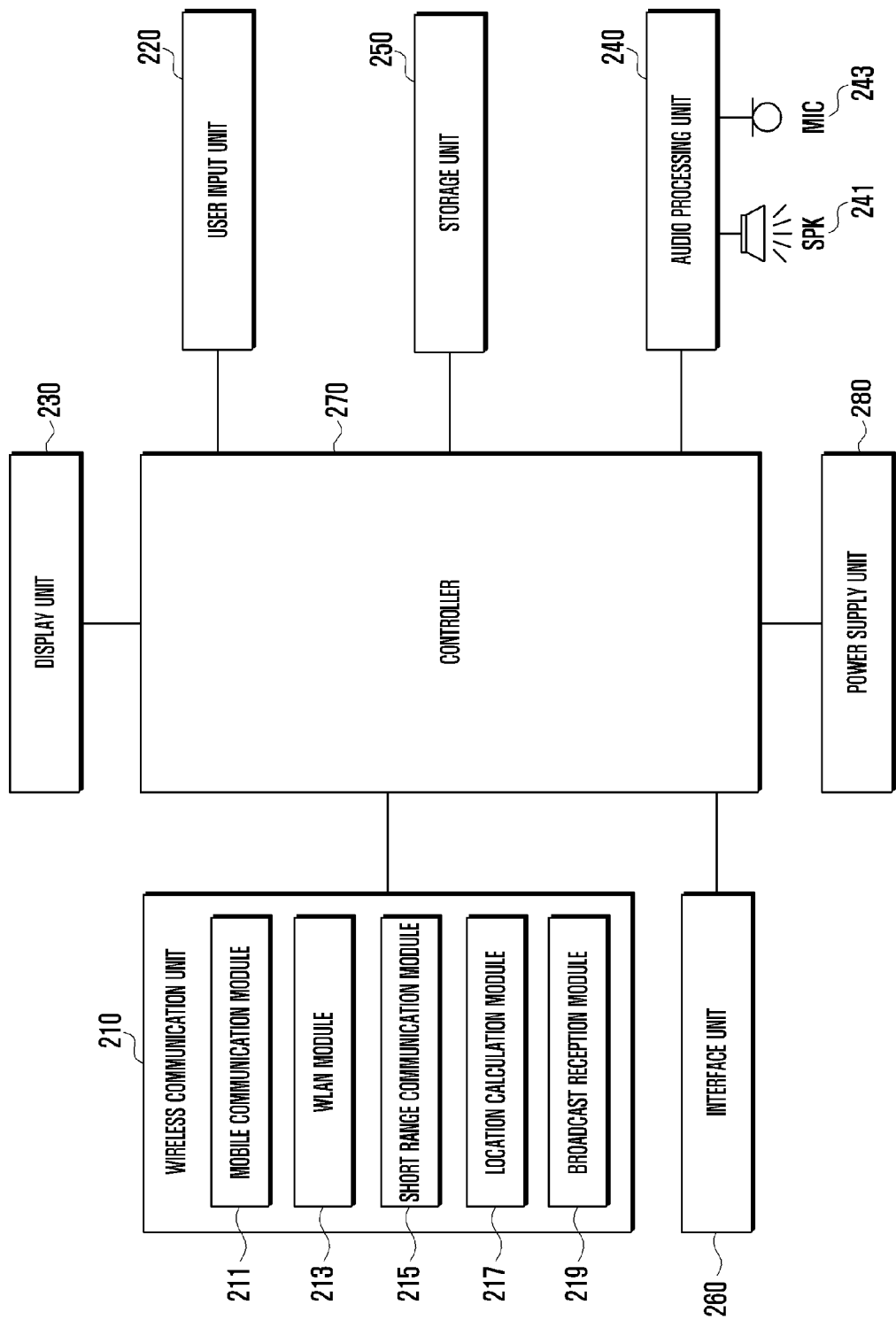
FIG. 2 schematically illustrates a configuration of a portable terminal according to an exemplary embodiment.

FIG. 2 schematically illustrates a configuration of a portable terminal according to an exemplary embodiment. In FIG. 2, the portable terminal represents the first portable terminal 100 and the second portable terminal 300 described above, the configuration of FIG. 2 may be implemented to be both the first portable terminal 100 and the second portable terminal 300.

Referring to FIG. 2, the portable terminal of the exemplary embodiment may include a wireless communication unit 210, a user input unit 220, a display unit 230, an audio processing unit 240, a storage unit 250, an interface unit 260, a controller 270 and a power supply unit 280. The components of the portable terminal illustrated in FIG. 2 are not essential elements, and thus it is possible to include further components or fewer components.

The wireless communication unit 210 may include one or more modules which allow a wireless communication between the portable terminal and the wireless communication system or between the portable terminal and the network where the portable terminal is located. For example, the wireless communication unit 210 may include a mobile communication module 211, a wireless LAN module 213, a short range communication module 215, a location calculation module 217 and a broadcast reception module 219, etc.

The mobile communication module 211 transmits and receives a wireless signal with at least one of a base station, an external terminal and a server in a mobile communication network. The wireless signal may include various forms of data according to transmission and reception of a voice call signal, a video call signal or a letter/multimedia message. In particular, the mobile communication module 211 may transmit a location check message through a cellular network, receive a response message through the cellular network, and receive an encryption key through the cellular network.

The wireless LAN module 213 represents a module for a wireless Internet connection, and may be embedded in the portable terminal or may be used as an external component. Wireless LAN (WLAN) (Wi-Fi), wireless broadband (Wibro), world interoperability for microwave access (Winmax), high speed downlink packet access (HSDPA), etc. may be used as a wireless Internet technology.

The short range communication module 215 represents a module for a short range communication. Some examples of the short range communication are Bluetooth, radio frequency identification (RFID), infrared data association (IrDA), ultra wideband (UWB), ZigBee, and near field communication (NFC), etc.

The location calculation module 217 is a module for obtaining the location of the portable terminal, and a representative example is a global positioning system (GPS). The location calculation module 217 may calculate information of the distance from three or more base stations and accurate time information, and apply trigonometry to the calculated information, thereby calculating the current 3-dimensional location information according to the latitude, longitude, and altitude. Further, the location calculation module 217 may produce location information by continually receiving the current location of the portable terminal from three or more satellites in real time. The location information of the portable terminal may be obtained in various methods.

The broadcast reception module 219 receives a broadcast signal (e.g., a TV broadcast signal, a radio broadcast signal, a data broadcast signal, etc.) and/or the broadcast-related information (e.g., information related with a broadcast channel, a broadcast program or a broadcast service provider, etc.) from an external broadcast management server through a broadcast channel (e.g., a satellite channel, a terrestrial channel, etc.). In particular, a digital broadcast signal received through the broadcast reception module 219 of the first portable terminal 100 may be cast to the adjacent second portable terminal 300.

The user input unit 220 generates input data for an operation control of a portable terminal by the user. The user input unit 220 may be composed of a keypad, a dome switch, a touch pad (static pressure/static power), a jog wheel, a jog switch, etc.

The display unit 230 displays (outputs) information processed in a portable terminal. For example, when the portable terminal is in a calling mode, the call-related UI or GUI is displayed. When the portable terminal is in a video call mode or a photographing mode, the display unit 230 displays a photographed or/and received image, UI or GUI. In particular, the display unit 230 displays an UI or GUI related with the operation of an adjacent friend search service of an exemplary embodiment. In particular, the display unit 230 may divide the list of friends of another user existing in an area adjacent to the location of the user by distances, and display the divided list. The configuration of the screen of the display unit 230 operated in the exemplary embodiment and a screen example thereof will be described later.

The display unit 230 may include at least one of a liquid crystal display (LCD), a thin film transistor liquid crystal display (TFT LCD), a light emitting diode (LED), an organic LED (OLED), an active matrix OLED (AMOLED), a flexible display, a bended display, and a 3D display. Some of these displays may be implemented as a transparent display which is formed as a transparent type or light-permeable type so that the outside may be seen.

According to an exemplary embodiment, when a display unit 230 and a touch panel for sensing a touch operation may form a mutual layer structure (hereinafter, referred to as "touch screen"), the display unit 230 may also be used as an input device as well as an output device.

The touch panel may be configured to convert a change in a pressure applied to a certain part of the display unit 230 or a capacitance generated in a certain part of the display unit 230 into an electrical input signal. The touch panel may be configured to detect a pressure at the time of a touch as well as a touched location and area. When there is a touch input on the touch panel, signals corresponding thereto are sent to the touch controller (not shown). The touch controller processes the signals and transmits corresponding data to the controller 270. As such, the controller 270 may recognize which part of the display unit 230 has been touched.

The audio processing unit 240 transmits an audio signal inputted from the controller 270 to the speaker 241, and transmits the audio signal inputted from the microphone such as a voice to the controller 270. The audio processing unit 240 may convert voice/sound data into audible sounds and output the sounds through the speaker 241 according to the control of the controller 270 and convert the audio signals of the voice received from the microphone 243 into digital signals and transmit the digital signals to the controller 270. In particular, the audio processing unit 240 according to an exemplary embodiment outputs sounds including the encryption key under the control of the controller 270. The audio processing unit 240 processes an output by output intensity according to the level which is set under the control of the controller 270 when a sound including an encryption key is outputted through the speaker 241. In an exemplary embodiment, at least one of the audio processing unit 240 and the speaker 241 may include an additional circuit or electronic component (e.g., a resistance, condenser, etc.) so that an outputted sound may be inputted through a microphone (not shown) of another portable terminal existing in an adjacent area.

The speaker 241 may output audio data which is received from the wireless communication unit 210 at a recording mode, a voice recognition mode, a broadcast reception mode, etc., or is stored in the storage unit 250. The speaker 241 may output a sound signal related with the function (e.g., a calling signal receiving sound, a message receiving sound, etc.) performed in the portable terminal. In particular, the speaker may output a sound including an encryption key according to the set output intensity.

The microphone 243 receives external sound signals while in a calling mode, recording mode, voice recognition mode, etc., and processes the signals as electrical voice data. The processed voice data may be converted into a form transmittable to a mobile communication base station through the mobile communication module 211, and then be outputted. Various noise removing algorithms for removing a noise generated in the processing receiving external sound signals may be implemented in the microphone 243. In the exemplary embodiment, the microphone 243 may receive sounds outputted in the speaker of another portable terminal (not shown) and then transmit the sounds to the controller 270.

The storage unit 250 may store a program for processing and control of the controller 270, and may perform a function of temporarily storing inputted/outputted data (e.g., a phone number, message, audio, still image, electronic book, moving picture, sound, encryption key, etc.). Use frequency (e.g., the use frequency of each phone number, each message and each multimedia) for each set of the data, and important data may be stored in the storage unit 250. Further, data about various patterns of vibrations and sounds outputted at the time of a touch input on a touch screen may be stored in the storage unit 250.

The above storage unit 250 may include at least one of storage media of a flash memory type, hard disk drive type, micro type and card type memory (e.g., SD or XD memory, etc.), a random access memory (RAM), a static random access memory (SRAM), a read-only memory (ROM), an electronically erasable programmable read-only memory (EERPOM), a programmable read-only memory (PROM), a magnetic memory, a magnetic disk drive, and an optical disk drive. The portable terminal may be operated in connection with web storage for performing a storage function of the storage unit 250 via the Internet.

The interface unit 260 plays a role of a path with all external devices connected to the portable terminal. The interface unit 260 may receive data transmitted from the external device or be supplied power and transmit the data or power to each component inside the portable terminal, or control the data inside the portable terminal to be transmitted to the external device. For example, a wired/wireless headset port, an external charger port, a wired/wireless data port, a memory card port, a port connecting a device including an identification module, an audio input/output (I/O) port, a video I/O port, an earphone port, etc. may be included in the interface unit 260.

The controller 270 controls the overall operation of the portable terminal. For example, a related control and processing for a voice call, data communication, video call, etc. may be performed. The controller 270 may include a multimedia module for a multimedia replay. The multimedia module may be implemented within the controller 270, and may be implemented separately from the controller 270. In particular, the controller 270 performs overall control for an operation of an adjacent friend search service.

When operating an adjacent friend search service, the controller 270 may control operation of the sending portable terminal initiating the adjacent friend search service, and may control operation of the receiving portable terminal receiving sounds of the sending portable terminal by turning on the microphone 243 when receiving the push message of the contact server 200.

First, a case in which a portable terminal is operated as a sending portable terminal will be described.

If a user executes an adjacent friend search service (e.g., executes an adjacent friend search application or selects a cast function icon), the controller 270 generates a location check message and transmits the message to the contact server 200. The controller 270 transmits the location check message, loads the encryption key (sending encryption key) in the sound, and outputs the sound so that one or more receiving portable terminals in an area adjacent to the location of the sending portable terminal may receive the encryption key. The controller may control the sound output based on the output intensity according to the set level.

When outputting a sound and receiving an encryption key from one or more receiving portable terminals, the controller 270 may compare the sent encryption key with the received encryption key so as to determine whether they coincide. Further, when the encryption key of the sending portable terminal is the same as that of the receiving portable terminal, the controller 270 may determine that the receiving portable terminal exists in an area adjacent to the sending portable terminal, and visually convert information on the sending portable terminal having the same encryption key so as to display the list of friends existing in an adjacent area.

Further, when user selects one or more friends from the list of friends and requests data sharing, the controller 270 may control formation of a wireless LAN link with the receiving portable terminal corresponding to one or more friends selected through the wireless LAN module 213. When forming a wireless LAN link, the controller 270 may control transmission or streaming of sharing-requested data when forming a wireless LAN link.

Next, a case in which a portable terminal is operated as a receiving portable terminal will be described.

When receiving a push message from the contact server 200, the controller may control the turn-on of the microphone 243. At this time, the controller 270 may determine whether to turn on the microphone based on the location information of the receiving portable terminal. When the sound outputted by the sending portable terminal is received through the turned-on microphone 243, the controller 270 may obtain the encryption key by decoding the received sound. Further, the controller 270 controls the obtained encryption key to be transmitted to the sending portable terminal through the contact sever 200 or cellular network.

Further, when an invitation for data sharing from the sending portable terminal is received, and the invention is accepted according to the user's selection, the controller 270 may control to receive data transmitted (or streamed) from the sending portable terminal through the wireless LAN module 213, and display the data.

The power supply unit 280 may be authorized to supply external power and internal power by the control of the controller 270, and supply power needed for operation of each component.

Further, various exemplary embodiments may be implemented in a recording medium which may be read by a computer or the like using software, hardware or a combination thereof. According to implementation by hardware, exemplary embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and electrical units for performing other functions. In some cases, the exemplary embodiments may be implemented by the controller 270. According to implementation by software, the exemplary embodiments such as the procedures and functions described in the present specification may be implemented by separate software modules. Each of the software modules may perform one or more functions and operations described in the present specification.

Further, the portable terminal shown in FIG. 2 may include all devices using an application processor (AP), a graphic processing unit (GPU) and a central processing unit (CPU) such as all information communication devices, multimedia devices, and application devices thereof. For example, the portable terminal may include devices such as a tablet PC, a smart phone, a digital camera, a portable multimedia player (PMP), a media player, a portable game console, a laptop computer and a personal digital assistant (PDA) which are operated based on each of the communication protocols. Further, the method of controlling the function of the exemplary embodiments may be applied to various display devices such as a digital TV, a digital signage (DS), and a large format display (LFD), and be operated.

Figure 3:
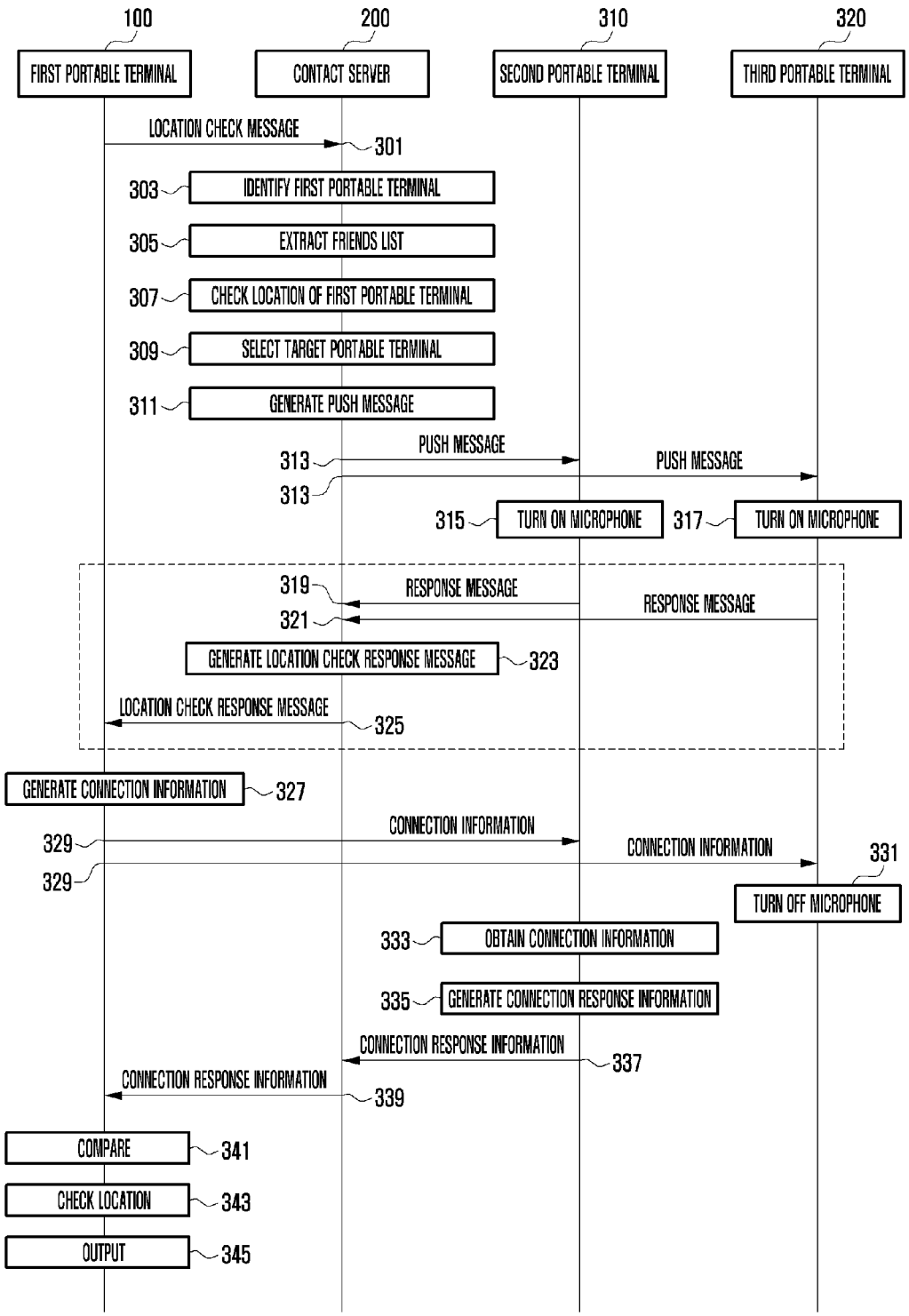
FIG. 3 illustrates an operation of transmission and reception between system components for a friend search service according to an exemplary embodiment.

FIG. 3 illustrates an operation of transmission and reception between system components for a friend search service according to an exemplary embodiment.

As illustrated in FIG. 3, FIG. 3 illustrates a case in which a contact server 200 tracks other portable terminals existing in the same area as that of the first portable terminal 100 (e.g., a coverage area of a base station to which the first portable terminal 100 belongs) based on the location of the first portable terminal 100, and supports the friend search service of the present invention.

Referring to FIG. 3, the first portable terminal 100 may transmit a location check message to the contact server 200 in response to the user's request (301). For example, the user of the first portable terminal 100 may select a friend search application (or in the case of a casting scheme, a cast function icon), and request execution of an adjacent friend search service in order to search for friends adjacent to the user or to share data of the first portable terminal 100 with adjacent friends or cast the data to the friends. Then the first portable terminal 100 may execute the adjacent friend search service. Further, the first portable terminal 100 may generate a location check message and transmit the message to the contact server 200. The location check message may be a message related to requesting the location check of one or more other users adjacent to user among users related with the user of the first portable terminal 100. The location check message includes message type information indicating that the transmitted message is a message that requests the location check of other users related with the user of the first portable terminal 100 according to the adjacent friend search service, and identification information for identification of the first portable terminal and the user of the first portable terminal 100, and may optionally include information of the location where the first portable terminal 100 is currently located.

When receiving the location check message from the first portable terminal 100, the contact server 200 may identify the first portable terminal 100 (303). When receiving a message from the first portable terminal 100, the contact server 200 may check the message type of the message through parsing of the message. The message type may be checked from the message type information included in the message. When the message type corresponds to the location check message according to the adjacent friend search service, the contact server 200 may identify the first portable terminal 100 based on the identification information included in the location check message.

The contact server 200 may extract the list of friends related with the user of the first portable terminal 100 from the database (not shown) according to the identification information on the first portable terminal 100 (305). For example, the user of the first portable terminal 100 may register identification information on one or more other users related with the user or portable terminals thereof in advance. The identification information registered by the user of the first portable terminal 100 may be registered in the database of the contact server 200. The identification information may be registered individually or as a group according to the relationship setting of the user. For example, a certain user such as friend 1, friend 2, family 1, family 2, fellow 1, etc. may be registered, or one or more other users such as friend group 1, family group, company group, etc. may be designated and registered as a certain group.

The contact server 200 may extract the list of friends, and check the location of the first portable terminal 100 (307). The contact server 200 may check the location of the first portable terminal 100 from the location information of the first portable terminal included in the location check message. Further, the contact server 200 may check the network (e.g., a cellular network) to which the first portable terminal 100 belongs from the identification information of the first portable terminal 100, and estimate the location of the first portable terminal 100 from the checked network.

The contact server 200 may select one or more target portable terminals (or subject users) for connecting the adjacent friend search service (309). The contact server 200 may select other portable terminals existing in a location corresponding to the current location of the first portable terminal 100 (e.g., within the coverage of the same base station) from the list of friends related with the user of the first portable terminal 100. The contact server 200 may be divided into network units (especially, the base station unit) for the location of portable terminals in conjunction with the network.

The contact server 200 may generate a push message requesting, to another portable terminal, a conversion into a wake-up state in order to wait for reception of a sound outputted by the first portable terminal according to the adjacent friend search service (311). The push message may include message type information indicating that the transmitted message is a message of requesting a wake-up state conversion according to the adjacent friend search service and identification information for identification of the user of the first portable terminal 100, and may optional include the information of the location where the first portable terminal 100 is currently located. The contact server 200 may generate the push message according to the number of the selected other portable terminals.

The contact server 200 may transmit the generated push message to the selected other portable terminals (313). FIG. 3 illustrates that the selected other portable terminals are the second portable terminal 310 and the third portable terminal 320. Hence, the contact server 200 may respectively transmit the push message to the second portable terminal 310 and the third portable terminal 320.

When receiving the push message from the contact server 200, the second portable terminal 310 and the third portable terminal 320 may turn on the microphone 243 (315 and 317). When receiving the message from the contact server 200, the second portable terminal 310 and the third portable terminal 320 may check the message type of the message through parsing the message. The message type may be checked from the message type information included in the message. Further, when the message type corresponds to the push message according to the adjacent friend search service, the second portable terminal 310 and the third portable terminal 320 may turn on the microphone 243 and convert the state into a wake-up state waiting for the reception of the sound in response to the push message.

When turning on the microphone 243, the second portable terminal 310 and the third portable terminal 320 may respectively generate a response message corresponding to the push message, and transmit the generated message to the contact server 200, respectively (319 and 321). The response message may be a message for notifying that the push message transmitted by the contact server 200 has been received, and a wake-up conversion has been performed in response to the push message.

When receiving the response message from the second portable terminal 310 and the third portable terminal 320, respectively, the contact server 200 may generate a location check response message corresponding to the location check message (323), and transmit the generated location check response message to the first portable terminal 100 (325). The location check response message may correspond to a message including acknowledgement information for providing information that there is a second portable terminal 310 near the first portable terminal 100 in connection with the location check message transmitted by the first portable terminal 100, and the adjacent friend search service may be possible. The location check response message may include identification information of the second portable terminal 320 and the third portable terminal 330 having responded to the push message. When failing to receive a response message corresponding to the push message, the contact server 200 may additionally perform a push message retransmission and waiting time count. Further, when a response message is not received until the waiting time expires, negative acknowledgement (NACK) information for providing information that the adjacent friend search service is impossible may be included in the location check response message, and be transmitted.

Further, in the present invention, steps 319 and 325 may be omitted. According to an exemplary embodiment of the present invention, the second portable terminal 310 and the third portable terminal 320 may turn on the microphone 24, then wait for reception of a sound from the first portable terminal 100 without a response message generation and transmission procedure, and may be operated only by performing the following operations when the sound is inputted through the microphone 243. Hence, as the response message transmission procedure of the second portable terminal 310 and the third portable terminal 320 is omitted, it is obvious to those skilled in the art that steps 323 and 325 may also be omitted in the contact server 200.

When receiving the location check message corresponding to the location check message from the contact server 200, the first portable terminal 100 may generate the connection information (327). The connection information denotes an encryption key for authentication with one or more other portable terminals adjacent to the first portable terminal.

The first portable terminal 100 may output the sound including the connection information through the speaker 241 (329). The first portable terminal 100 may output the sound including the connection information with the output intensity of the speaker 241 according to the preset reaching distance.

Further, In FIG. 3, it is assumed that the sound outputted by the first portable terminal 100 is transmitted to the second portable terminal 310, and the sound is not transmitted in the third portable terminal 320. That is, it is assumed that the second portable terminal 310 exists within the sound-reaching range and the third portable terminal 320 exists beyond the sound-reaching range on the basis of the first portable terminal 100. Hence, the sound including the connection information outputted in the first portable terminal 100 is received only at the second portable terminal 310 through the microphone 243, but the sound is not received at the third portable terminal 310.

Under the assumption, when the sound including the connection information is inputted through the microphone 243, the second portable terminal 310 may obtain the connection information loaded in the sound by decoding the sound (333). Further, the second portable terminal may generate the connection response information corresponding to the connection information when obtaining the connection information (335), and transmit the generated information to the contact server 200 (337). The contact server 200 may transmit the connection response information of the second portable terminal 310 to the first portable terminal 100 (339). When the sound is transmitted from the first portable terminal 100 in a wake-up state which has been converted according to the push message, the second portable terminal 310 may transmit the connection information included in the sound to the contact server 200 as the connection response information in order to transmit the information to the first portable terminal. In the exemplary embodiment, the connection information and the connection response information are divided according to the transmitting subjects for the convenience of explanation, and may correspond to the encryption keys, respectively. At this time, the connection information and the connection response information may be the same encryption key or other encryption keys, respectively. Further, the connection response information may selectively include the location information of the second portable terminal 310.

FIG. 3 illustrates that the connection response information of the second portable terminal 310 is transmitted to the first portable terminal 100 through the contact server 200, but the connection response information may also be transmitted to the first portable terminal through the cellular network. Further, according to an exemplary embodiment, when the connection response information of the second portable terminal 310 does not include the location information of the second portable terminal 310, the location information of the second portable terminal 310 may be transmitted together at the time when the contact server 200 or cellular network transmits the connection response information to the first portable terminal 100.

Further, when the sound including the connection information is not inputted from the first portable terminal until a certain time passes after the microphone 243 is turned on, the third portable terminal 320 may turn off the microphone 243 (331). At this time, in a state in which the microphone 243 is turned on, if the sound without connection information is inputted from other unspecified portable terminals while waiting for a sound input, the third portable terminal 320 may disregard the sound and turn of the microphone 243 after a certain time passes.

After outputting the sound including the connection information, when the connection response information of one or more other portable terminals (e.g., the second portable terminal 310) is received through the contact server 200, the first portable terminal 100 may compare the connection information generated by the first portable terminal 100 with the received connection response information (341). When the connection response information is received from one or more other portable terminals, the first portable terminal 100 determines that there are other portable terminals in an adjacent area. Further, when checking the existence of the other portable terminals, the first portable terminal 100 may compare the connection information with the connection response information and determine whether they coincide with each other.

If the connection information coincides with the connection response information, the first portable terminal 100 may check the location of one or more portable terminals (e.g., the second portable terminal 310) existing in an area adjacent to the first portable terminal 100 (343). The first portable terminal 100 may determine the location of the second portable terminal 310 based on the location information transmitted by the second portable terminal 310 or the location information of the second portable terminal transmitted by the contact server 200 along with the connection response information.

The first portable terminal 100 may output the location of the second portable terminal 310 through a given screen interface (345). The first portable terminal 100 may give a feedback to user through the given UI or GUI by visualizing the information on the portable terminal existing in an adjacent area and the location of the portable terminal when checking the location of the second portable terminal 310.

Further, FIG. 3 illustrates that, after performing the operation of extracting the list of friends of step 305, the location of the first portable terminal 100 is checked at step 307, but the exemplary embodiments do not necessarily follow such an order, and the operations may be performed in parallel or step 307 may be first performed.

Further, though omitted in FIG. 3, when transmitting the location check message to the contact server 200, the first portable terminal 100 may include user information on one or more other users according to the user's selection in the location check message, and transmit the message. Then the contact server 200 may check the location of other portable terminals based on the user information when receiving the location check message, and transmit the checked push message to another portable terminal.

Figure 4:
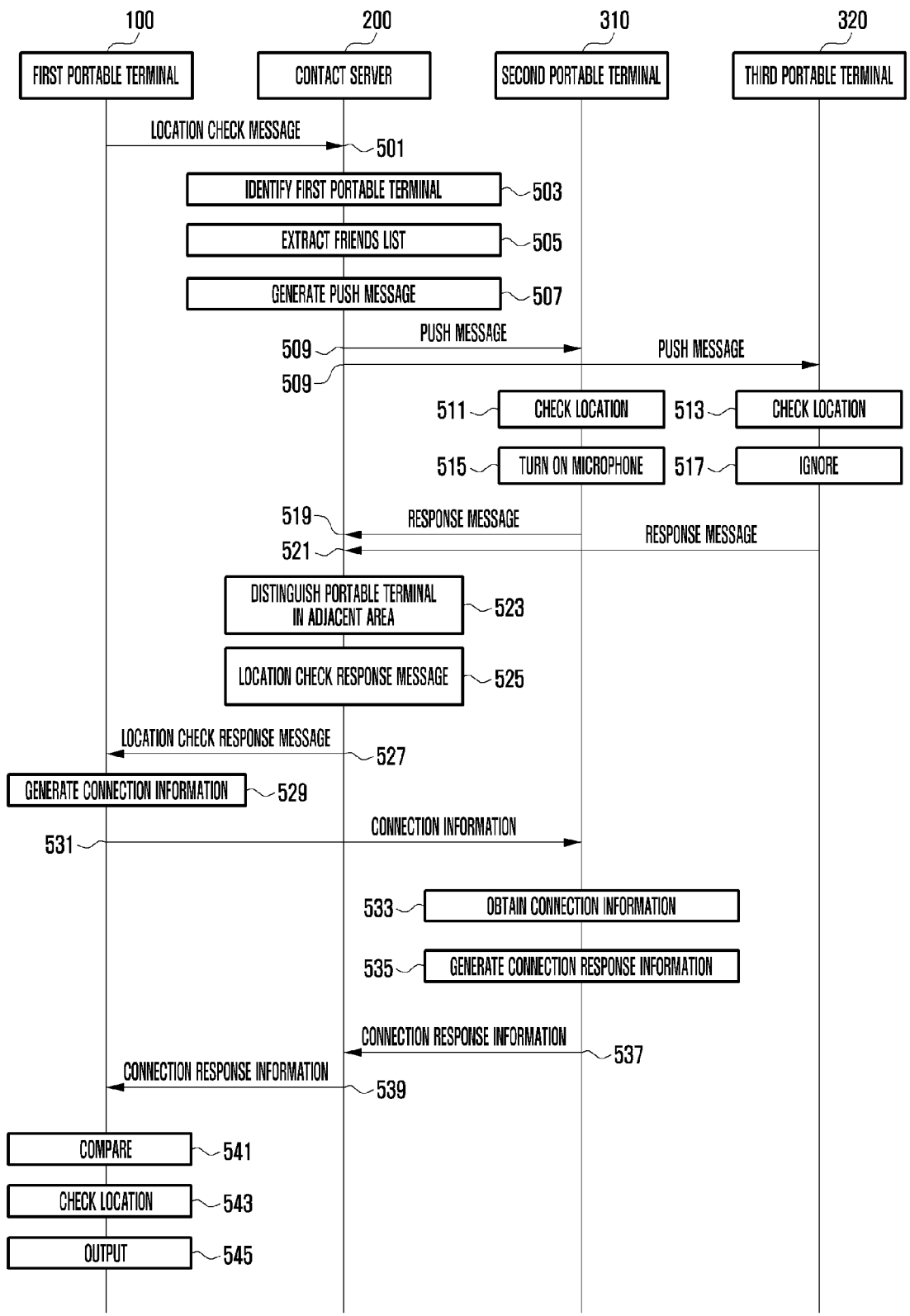
FIG. 4 illustrates another example of signal transmission and reception between system components for a friend search service according to an exemplary embodiment.

FIG. 4 illustrates another example of signal transmission and reception between system components for a friend search service according to an exemplary embodiment.

As shown in FIG. 4, unlike FIG. 3, FIG. 4 illustrates an example of a case in which the contact server 200 transmits the push message to portable terminals of one or more other users related with the user of the first portable terminal 100, determines whether the portable terminal having received the push message belongs to an area adjacent to the first portable terminal, and supports the friend search service of the exemplary embodiment. Further, FIG. 4 omits specific description about the configuration corresponding to FIG. 3.

Referring to FIG. 4, the first portable terminal 100 may transmit the location check message to the contact server 200 in response to the user's request (501). The location check message includes the message type information and identification information, and may optionally include the location information of the first portable terminal 100 and user information (or identification information) about one or more other users designated by the user of the first portable terminal.

When receiving the location check message from the first portable terminal 100, the contact server 200 may identify the first portable terminal 100 (503). The contact server 200 may extract the list of friends related with the user of the first portable terminal 100 according to the identification information on the first portable terminal 100 (505).

The contact server 200 may generate a push message for requesting other portable terminals corresponding to the list of friends to be converted into a wake-up state in order to wait for reception of the sound outputted by the first portable terminal (507). The push message may include message type information, identification information and location information of the first portable terminal 100.

The contact server 200 may transmit the push message to the other portable terminals (509). FIG. 4 illustrates that the other portable terminals according to the list of friends are the second portable terminal 310 and the third portable terminal 320. Hence, the contact server 200 may respectively transmit the push message to the second portable terminal 310 and the third portable terminal 320. Further, the list of friends may be constituted from the information extracted based on the identification information of the first portable terminal 100 in the contact server 200, or from the identification information provided by the first portable terminal.

When receiving the push message from the contact server 200, the second portable terminal 310 and the third portable terminal 320 may check the location of the first portable terminal 100 and the location of themselves (511 and 513). For example, when receiving the push message, the second portable terminal 310 and the third portable terminal 320 may determine the location of the first portable terminal from the location information of the first portable terminal 100 included in the push message. Further, each of the second portable terminal 310 and the third portable terminal 320 may determine their locations from the location information thereof. The second portable terminal 310 and the third portable terminal 320 may determine whether they exist in a location corresponding to the current location of the first portable terminal 100 (e.g., within the coverage of the same base station) based on respective checked locations.

Further, FIG. 4 assumes that the second portable terminal 310 exists within the coverage of the same base station as that of the first portable terminal 100, and the third portable terminal 330 belongs to the coverage of a base station different from that of the first portable terminal 100. That is, the second portable terminal 310 may be a portable terminal existing in an adjacent area of the first portable terminal 310, and the third portable terminal 320 may be a portable terminal existing in an area other than the adjacent area of the first portable terminal. In the exemplary embodiment, the locations may be divided in base station units or preset distance (or range) units as stated above. For example, when 500 m is set as a criterion of an adjacent distance between the first portable terminal 100, the second portable terminal 310 and the third portable terminal 320, locations of the second portable terminal 310 and the third portable terminal 320 may be divided according to whether the terminals are within a 500 m radius of the first portable terminal 100. Here, the criterion of determining the adjacent distance may correspond to the reaching distance as a sound for outputting the portable terminal 100.

Under this assumption, the second portable terminal 310 may turn on the microphone 243 in response to the push message (515). When receiving the push message, the second portable terminal 310 may check the location in response to the push message. Further, if it is determined that the second portable terminal 310 is adjacent to the first portable terminal 100, the second portable terminal 310 may turn on the microphone 243 and convert the situation into a wake-up state waiting for reception of the sound. At this time, the second portable terminal 310 may generate a response message corresponding to the push message, and transmit the generated response message to the contact server 200 (519). The response message may indicate that a push message transmitted by the contact server 200 has been received, and a wake-up conversion has been performed in response to the push message. At this time, the response message transmitted by the second portable terminal 200 may include ACK information for informing of the fact that the adjacent friend search service performance is possible (i.e., exists in an area in which the adjacent friend search service of the first portable terminal 100 may be supported (i.e., an area adjacent to the first portable terminal 100)).

Further, the third portable terminal 320 may ignore the push message (517). When receiving the push message, the third portable terminal 320 may perform the location check in response to the push message. If it is determined that the third portable terminal 320 is in an area other than the area adjacent to the first portable terminal 100, the third portable terminal 320 may ignore the push message. The third portable terminal 320 may generate a response message corresponding to the push message, and transmit the message to the contact server 200 (521). The response message may indicate that the push message transmitted by the contact server 200 has been received, and the wake-up conversion by the push message is not possible. At this time, the response message transmitted by the third portable terminal 320 may include NACK information for indicating that the performance of the adjacent friend search service is impossible (i.e., exists in an area in which the adjacent friend search service of the first portable terminal 100 may not be supported (i.e., an area which is not adjacent to the first portable terminal 100)).

When receiving the response message from the second portable terminal 310 and the third portable terminal 320, the contact server 200 may distinguish the portable terminal adjacent to the first portable terminal 100 from the portable terminal which is not adjacent to the first portable terminal 100 (523). The contact server 200 may distinguish the portable terminal existing in an area adjacent to the first portable terminal through ACK information or NACK information included in the received response message.

The contact server 200 may generate a location check response message corresponding to the location check message (525), and transmit the generated location check response message to the first portable terminal 100 (527). The location check response message may include the identification information of the second portable terminal 320 and the third portable terminal 330, and ACK and NACK information thereof. Further, when a response message corresponding to the push message is not received, the contact server 200 may additionally perform retransmission of the push message and counting of the waiting time. Even when receiving the response message including NACK information from all portable terminals, the contact server 200 may include NACK information, which indicates that the adjacent friend search service performance is impossible, in the location check response message, and transmit the message.

When receiving the location check response message from the contact server 200, the first portable terminal 100 may generate connection information (529). Further, the first portable terminal 100 may output the sound including the connection information through the speaker 241 (531).

Further, in FIG. 4, according to the above assumption, the sound outputted by the first portable terminal 100 is transmitted to the second portable terminal 310, and the sound is not transmitted in the third portable terminal 320. That is, the second portable terminal 310 is within a sound-reaching range in an area adjacent to the first portable terminal, and the third portable terminal 320 is beyond the sound-reaching range in an area, which is not adjacent to the first portable terminal, on the basis of the first portable terminal 100. Hence, the sound including connection information outputted in the first portable terminal 100 may be inputted through the microphone 243 only in the second portable terminal 310.

As such, the sound including the connection information is inputted through the microphone 243, the second portable terminal 310 may obtain connection information loaded in the sound by decoding the sound (533). Further, when obtaining the connection information, the second portable terminal 310 may generate the connection response information (535), and transmit the generated information to the contact server 200 (537). The contact server 200 may transmit the connection response information of the second portable terminal 310 to the first portable terminal 100 (539). In the exemplary embodiment, the connection information and the connection response information have been divided according to the transmitted subject, and may be the same encryption key or respectively different encryption keys. Further, the connection response information may selectively include the location information sets of the second portable terminal 310 and the third portable terminal 320.

Here, in FIG. 4, the connection response information of the second portable terminal 310 may be transmitted to the first portable terminal 100 through the cellular network. Further, when the connection response information of the second portable terminal 310 does not include the location information of the second portable terminal 310, the contact server or cellular network may transmit the location information of the second portable terminal 310 together.

After outputting a sound including the connection information, when the connection response information of the second portable terminal 310 is received, the first portable terminal 100 may compare the connection information generated by the first portable terminal 100 with the received connection response information (541). When the connection information coincides with the connection response information, the first portable terminal 100 may check the location of the second portable terminal 310 existing in an adjacent area (543). Further, the first portable terminal 100 may output the location of the second portable terminal through the given UI or GUI (545).

Figure 5:
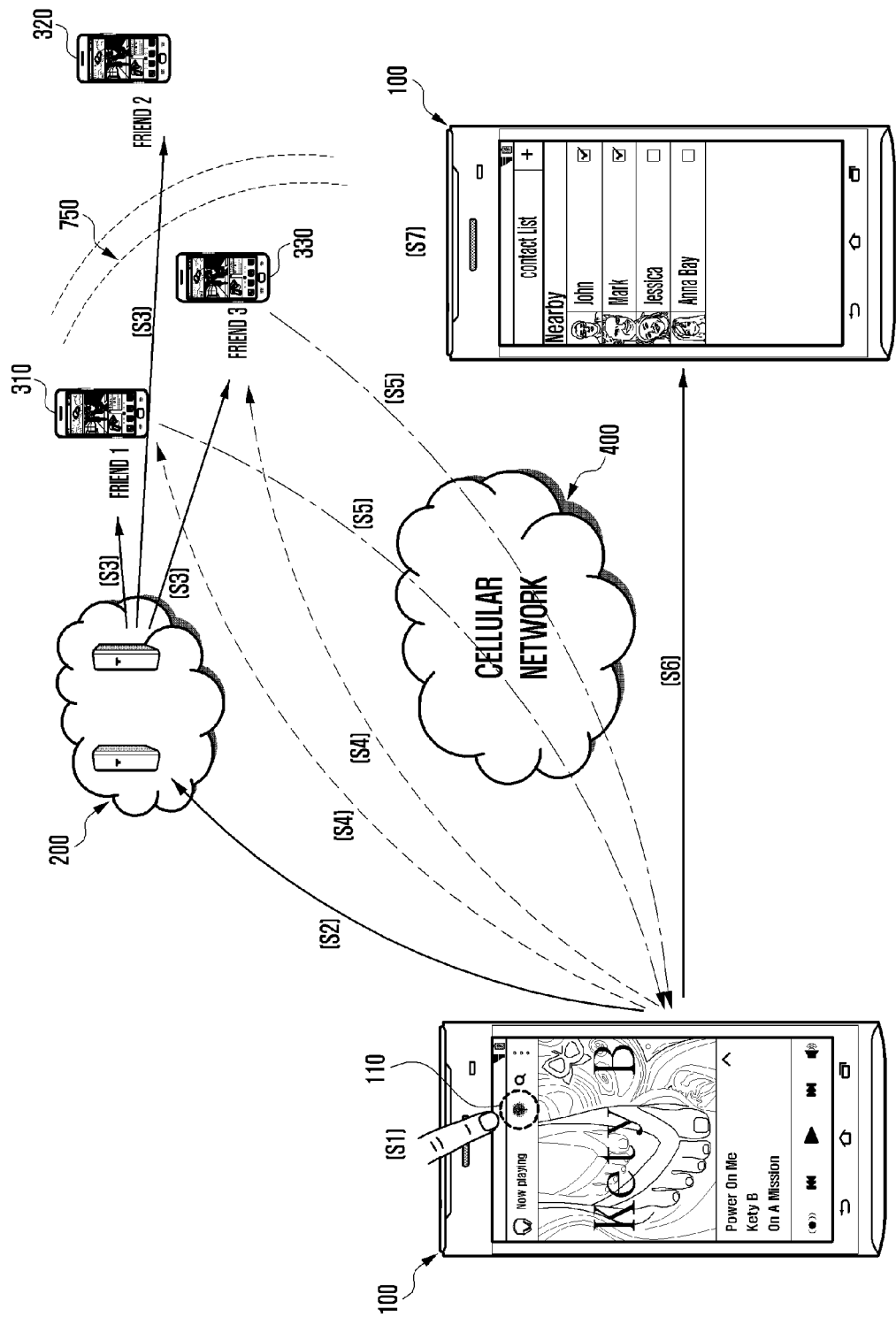
FIG. 5 illustrates an operation of providing an adjacent friend search service according to an exemplary embodiment.

FIG. 5 illustrates an operation of providing an adjacent friend search service according to an exemplary embodiment of the present invention.

As illustrated in FIG. 5, a user may desire to share data in use or data stored in the portable terminal with an adjacent friend or search whether there is a friend adjacent to user while listening to music, viewing moving pictures, and writing a document in the portable terminal 100. FIG. 5 shows the former case, and illustrates a case in which user desires to share music being played with an adjacent friend while listening to music.

Referring to FIG. 5, user may select the cast function icon 110 and execute the friend search service in order to share the music being played in the portable terminal 100 (S1). The cast function icon 110 may be provided to all forms of data screens displayed through the display unit 230 of the portable terminal 100. The cast function icon 110 represents an item for promptly executing the adjacent friend search service, and may be provided as part of the friend search application. That is, a user may promptly execute the adjacent friend search service based on the cast function icon 110 while maintaining the screen currently being displayed without a procedure of selecting the friend search application by a separate menu operation. The cast function icon 110 may be arranged according to an appropriate arrangement relationship with the function icon of the application and be provided in one area of the screen.

Further, if a user input is sensed through the cast function item 110, the portable terminal 100 may execute the adjacent friend search service, and transmit the location check message to the contact server 200 (S2). At this time, the portable terminal 100 may internally execute the processing according to the adjacent friend search service while maintaining the screen being displayed. At this time, in consideration of the user's intuition, when the user generates an input in the cast function icon 110, various forms of feedbacks indicating the execution of the adjacent friend search service may be outputted. For example, the feedbacks may be provided by a pop-up output through the display unit 230, a sound output through the speaker, etc.

When receiving the location check message from the portable terminal 100, the contact server 200 may extract other terminals within the coverage of the network corresponding to the location of the first portable terminal 100 from the list of friends related with the user of the first portable terminal 100, and transmit the push message to the extracted other portable terminals 310, 320 and 330 (S3). Further, in response to the received push message, the other terminals 310, 320 and 330 may turn on the microphone 243 and wait for the input of the output sound of the portable terminal 100.

The portable terminal 100 may transmit the location check message, load the encryption key in the sound, and output the sound through the speaker 241 (S4). The sound outputted in the portable terminal 100 may be transmitted to one or more other portable terminals positioned within the predefined reaching range as in the boundary shown in reference numeral 750. For example, in FIG. 5, the portable terminal 310 of friend 1, the portable terminal 320 of friend 2, and the portable terminal 330 of friend 3 are within the coverage of the same network as that of the portable terminal 100, and the portable terminal 310 of friend 1 and the portable terminal 330 of friend 3 are within the sound-reaching range (e.g., within the boundary of reference numeral 750), and the portable terminal 320 of friend 2 is beyond the sound-reaching range (e.g., beyond the boundary of reference numeral 750) among the portable terminals 310, 320 and 330. Hence, the sound outputted in the portable terminal may be transmitted to the portable terminal 310 of friend 1 and the portable terminal 330 of friend 3.

If the sound is inputted through the microphone 243, the portable terminal 310 of friend 1 and the portable terminal 320 of friend 3 may transmit the encryption key included in the sound to the portable terminal 100 through the cellular network 400 (S5).

After the sound including the encryption key is outputted, when receiving the encryption keys transmitted by the portable terminal 310 of friend 1 and the portable terminal 330 of friend 3 through the cellular network 400, the portable terminal 100 identifies the portable terminal located in an adjacent area through the authentication of the respective encryption keys (S6). That is, the portable terminal 100 may compare the generated encryption key, the encryption key transmitted by the portable terminal 310 of friend 1, and the encryption key transmitted by the portable terminal 330 of friend 3 to determine whether they coincide with each other.

When the portable terminal 310 of friend 1 and the portable terminal 330 of friend 3 are normally authenticated, the portable terminal 100 may visualize the location of one or more friends adjacent to the user, and may give a feedback through the given screen interface (S7). For example, as shown in S7 of FIG. 5, the list of normally authenticated friends may be provided through the display unit 230 by comparing the encryption key within the sound-reaching distance on the basis of the portable terminal 100. That is, the list of friends adjacent to the user of the first portable terminal is visually displayed, and the list may be listed in an adjacent order or in a random order. The detailed description about the screen interface according to an exemplary embodiment will be described with FIGS. 6 to 9.

Further, the portable terminal 100 may be connected to at least one of the portable terminal 310 of friend 1 and the portable terminal 330 of friend 3, which have been searched according to the user's input, trough the wireless local area network (WLAN). For example, when the existence of one or more other friends is checked, the user may desire to cast the music being played, and make the same music played in the friend's portable terminal so as to enjoy the music together. Hence, the user may select one or more friends among the searched adjacent friends, and perform casting. The casting may be performed in various methods. The portable terminal 100 supports sharing the moving pictures with other adjacent friends by transmitting (or streamlining) the music to the selected other portable terminals through the WLAN in response to the user's performance of casting.

Figure 6:
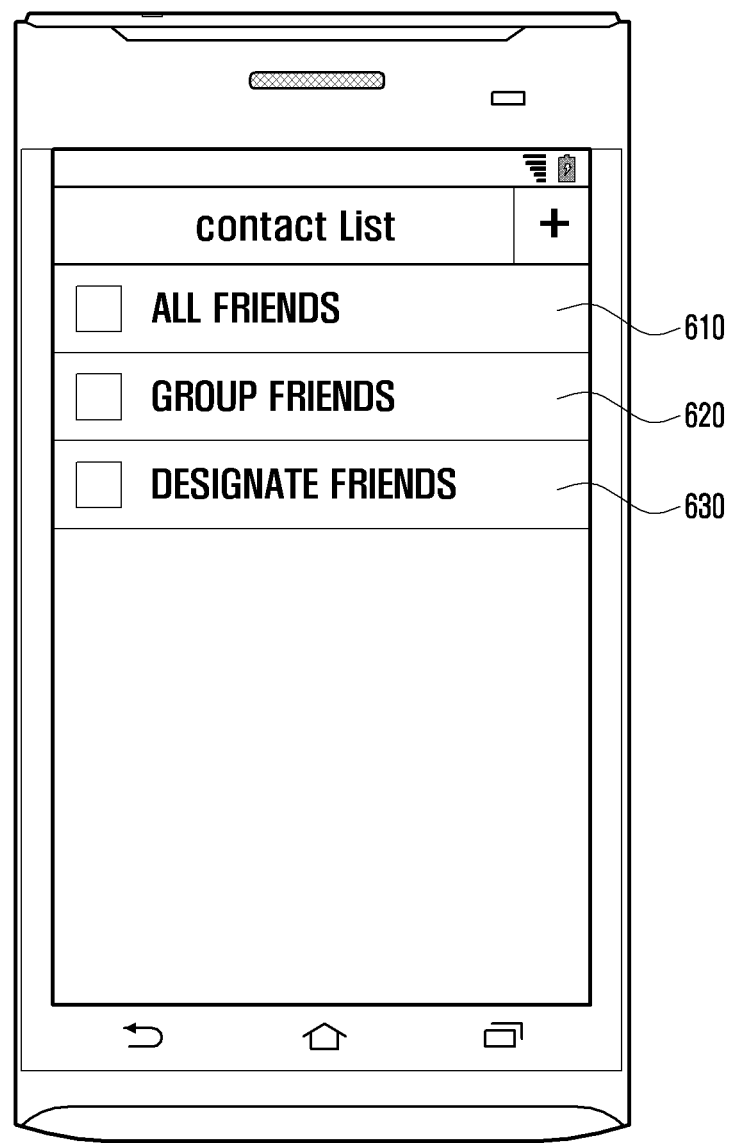
FIG. 6 illustrates a screen interface of selecting an object of a friend search service according to an exemplary embodiment.

FIG. 6 illustrates a screen interface of a portable terminal for supporting a friend search service according to an exemplary embodiment.

Referring to FIG. 6, FIG. 6 illustrates an example of a screen interface through which user may designate a friends group for an adjacent friend search service. As illustrated in FIG. 6, when operating the portable terminal or executing an adjacent friend search service, user may directly designate a desired friends group. For example, user may select all friends stored in the portable terminal as an object of an adjacent friend search service. Further, user may select friends of one or more groups as the object of the adjacent friend search service through <group friend> item 620. Further, user may select the objects of the adjacent friend search service in a method of individually selecting (or directly inputting) one or more friends through the <friend designation> item 630.

Figure 7:
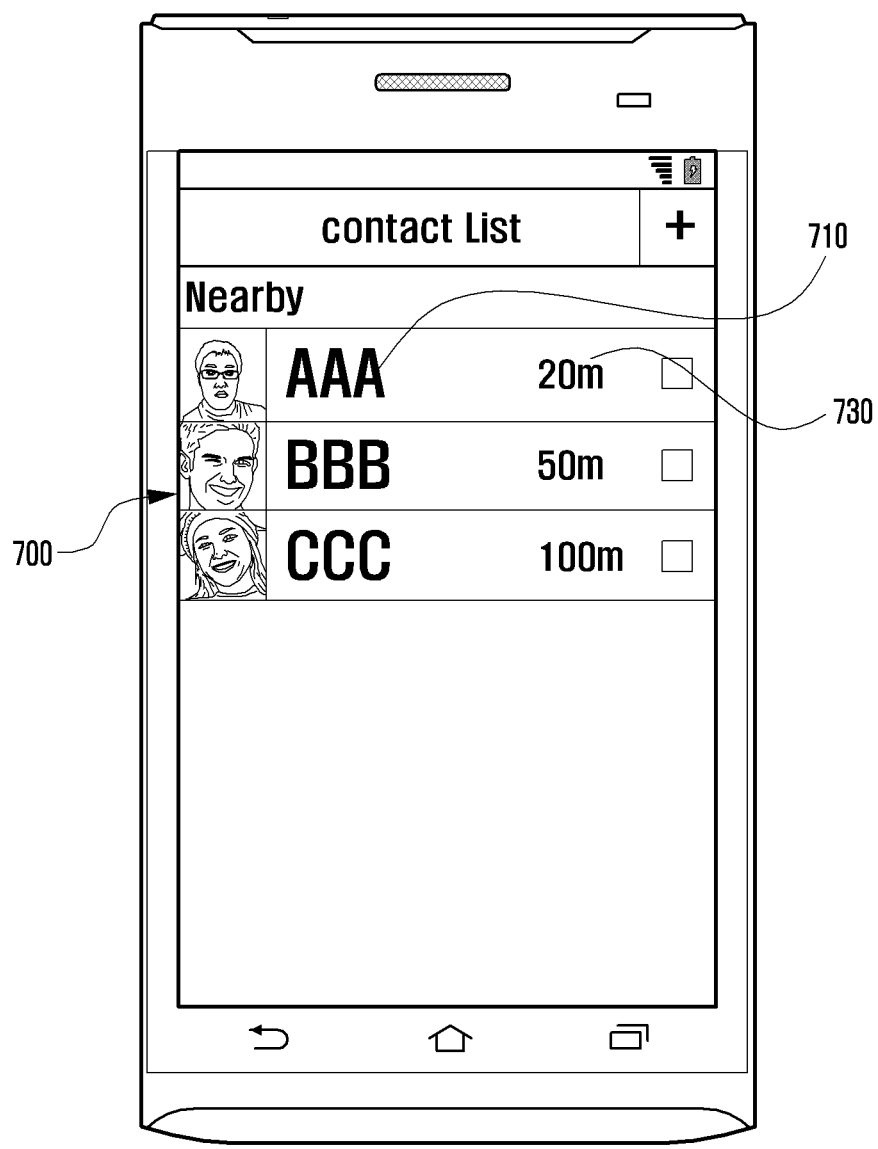
FIGS. 7 to 9 illustrate an example of a screen interface of a portable terminal for supporting a friend search service according to an exemplary embodiment.
Figure 8:
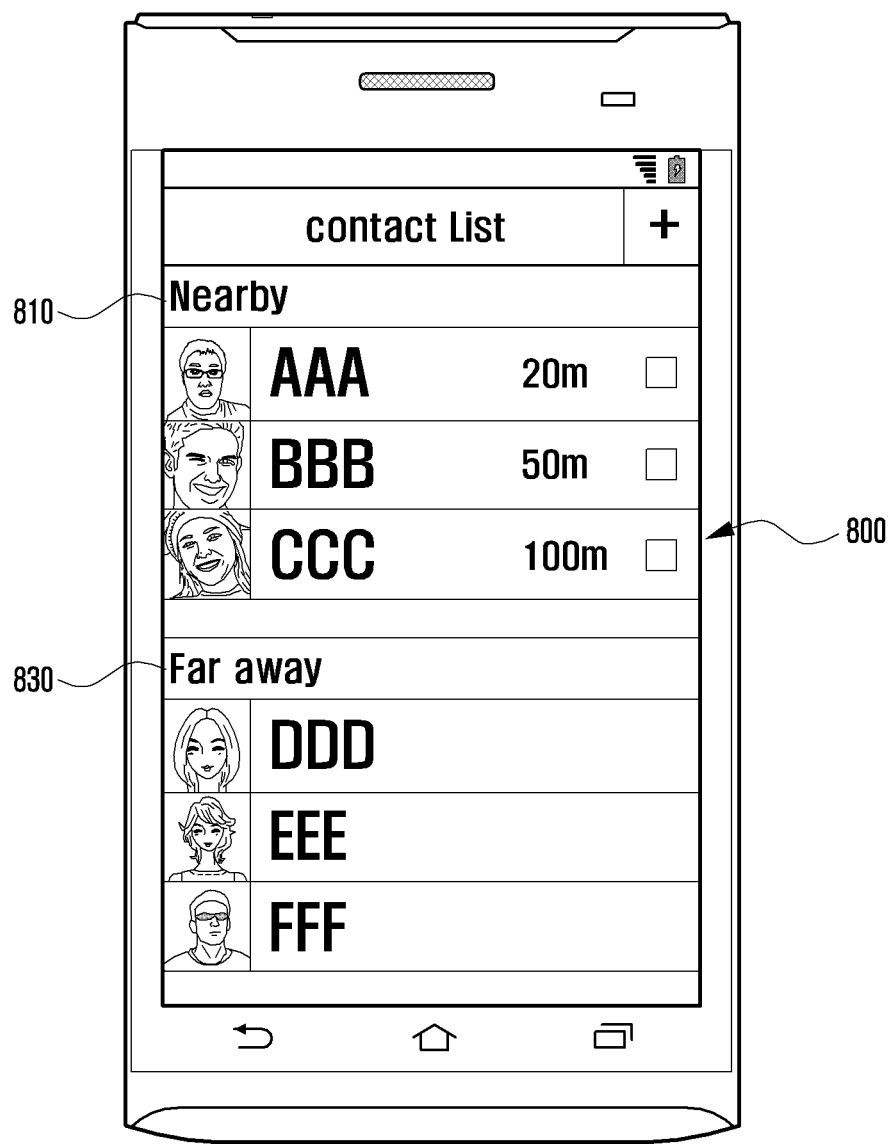
Figure 9:
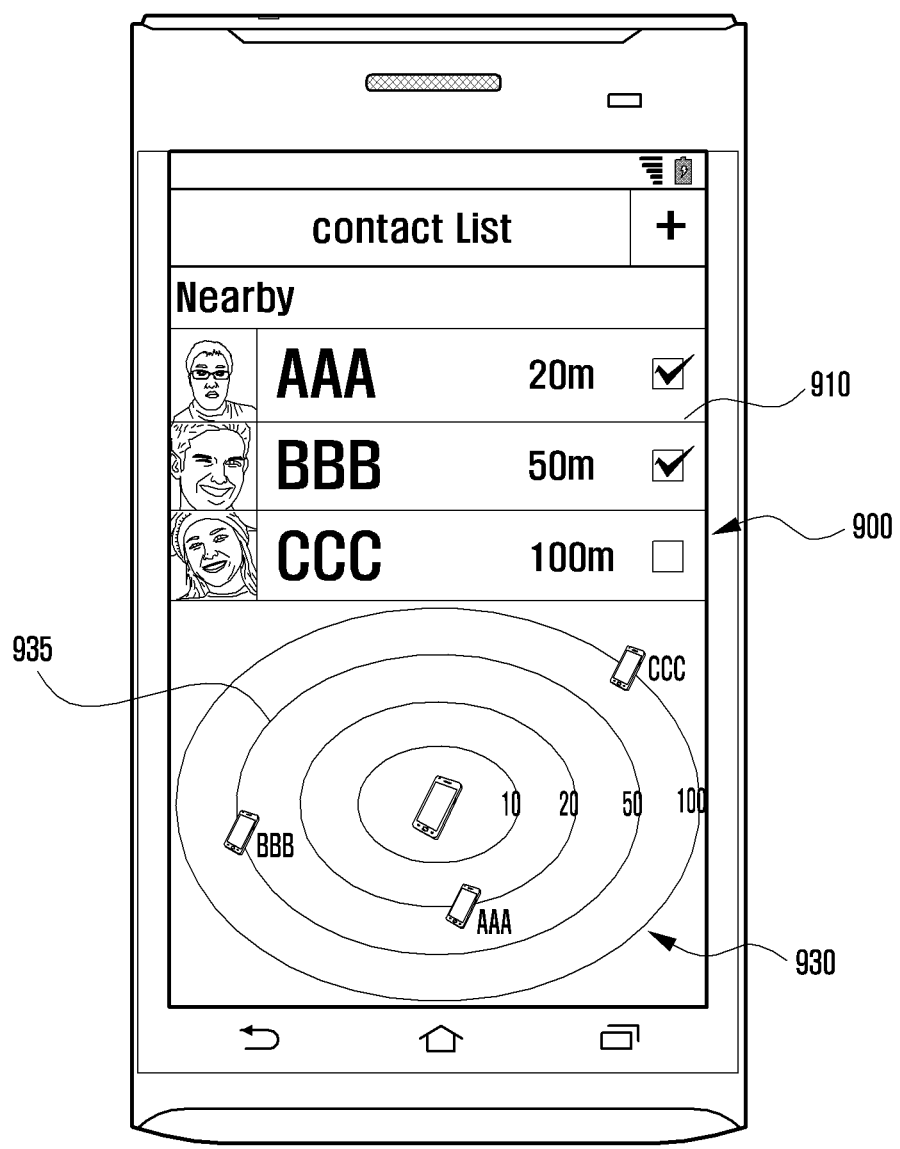

FIGS. 7 to 9 illustrate an example of a screen interface for supporting a friend search service according to an exemplary embodiment.

FIG. 7 illustrates a screen example of a list of friends among friends existing in an adjacent area.

As illustrated in FIG. 7, user information 710 related to friends in an adjacent area, which have been checked according to the execution of the adjacent friend search service, may be constituted as the friends list 700. The user information 710 may be generated based on the identification information of the receiving portable terminal responding to the request of the adjacent friend search service in the sending portable terminal which initiates the adjacent friend search service. At this time, the displayed user information 710 may be displayed based on the phone number, name, nickname, etc. stored in the sending portable terminal (e.g., AAA, BBB, and CCC). Further, in FIG. 7, the friends list may be listed in distance order according to relative proximity of friends. For example, the friends in the closest location may be first listed. Further, the friends list 700 may be provided with the distance information (e.g., 20 m, 50 m, 100 m) indicating the distance from the friends along with the user information 710 of friends.

FIG. 8 illustrates a screen example of a friends list in which friends in an adjacent area are distinguished from friends which are not in an adjacent area.

As illustrated in FIG. 8, the user information on friends in the adjacent area, which have been checked according to the execution of the adjacent friend search service, may be constituted and displayed as the friends list 800. In particular, FIG. 8 illustrates a case in which the friends list 800 is provided such that friends in the adjacent area are distinguished from friends not in an area which is adjacent to the user.

For example, it is assumed that there are 6 friends, whose location check has been requested according to the execution of the adjacent friend search service, i.e., "AAA", "BBB", "CCC", "DDD", "EEE", and "FFF", and three friends "AAA" "BBB" and "CCC" are in an adjacent area (the user of the portable terminal having responded to the adjacent friend search service) and three friends "DDD", "EEE" and "FFF" are not in an adjacent area (the user of the portable terminal having not responded to the adjacent friend search service).

When following this assumption, as illustrated in FIG. 8, the list of friends "AAA", "BBB" and "CCC" may be shown under <Nearby> item 810. The list of friends "DDD", "EEE" and "FFF" not in an area adjacent to the user may be displayed under <far away> item 830. That is, when providing the friends list 800, the friends in an adjacent area are distinguished from the friends in a non-adjacent area, and the friends in the adjacent area may be arranged in "Nearby area 810", and the friends in the non-adjacent area may be arranged in "far away area 830". Further, distance information (e.g., 20 m, 50 m and 100 m) indicating the distance with the friend may be provided along with the user information of friends in the friends list of the adjacent area, i.e., the friends list of Nearby item 810.

FIG. 9 illustrates a screen example of visually expressing the list of friends existing in adjacent areas.

As illustrated in FIG. 9, the user information about friends at an adjacent area, which has been checked according to the execution of the adjacent friend search service, may be constituted as the friends list 900 and be displayed. In particular, FIG. 9 illustrates a case in which a screen interface for intuitively and aesthetically checking the location of friends existing in an adjacent area on the basis of the user is provided. The screen interface shown in FIG. 9 may be divided into a search information area 910 where user information (e.g., a name, nickname, etc.) on friends, who may be connected in the adjacent area, is displayed, and a graphic area 930 where the adjacent level of the friends is visually displayed.

For example, it is assumed that the friends in an adjacent area (portable users having responded to the adjacent friend search service) are "AAA", "BBB" and "CCC". When following this assumption, as illustrated in FIG. 9, user information corresponding to friends such as "AAA", "BBB" and "CCC" may be provided to the search information area 910, and the friend information about "AAA", "BBB", and "CCC" friends may be arranged according to the adjacent distance and be displayed. The friend information may be provided based on the text such as user information or based on the icon by the combination of user information and the image of the portable terminal. The graphic area 930 may be provided in a form in which a round division line 935 for distance recognition forms an array structure according to the adjacent distance of friends.

For example, as described above, when the adjacent distances of "AAA", "BBB" and "CCC" friends are different from each other, three round division lines 930 may be shown in an array structure. On the other hand, when there is one friend in the adjacent area or two or more friends exist in similar distances, only one round division line 935 may be shown. In an exemplary embodiment, the division lines may be implemented in various forms such as a round, an oval and a quadrangle, etc.

Further, in the graphic area, the friends may be randomly arranged at appropriate positions according to the displayed number of friend information sets. Further, in the graphic area 930, the friends may also be arranged not only according to the distance, but also in consideration of the direction of the friends. In such a case, it may be appropriate to provide direction information of locations of the searched friends as well as the location information by distances of the friends. When considering direction, the friend information sets of the graphic area 930 may be rearranged according to the change of the direction of the portable terminals.

Further, in the search information area 910 and the graphic area 930, the distance information (e.g., 20 m, 50 m, and 100 m) indicating the distance with the friend as well as user information of friends (or friend information) may be provided.

Further, screen interfaces of FIGS. 7 to 9 have been individually explained above, but a user may adaptively convert and display screen interfaces as shown FIGS. 7 to 9 through the user input. For example, in a state in which a screen interface is displayed as in FIG. 7, user may convert the screen interface into a screen interface of FIG. 8 or FIG. 9 so as to display the interface. Hence, the portable terminal may determine the type of the screen interface according to the user's request, and reconfigure the screen interface according to the determined type.

Figure 10:
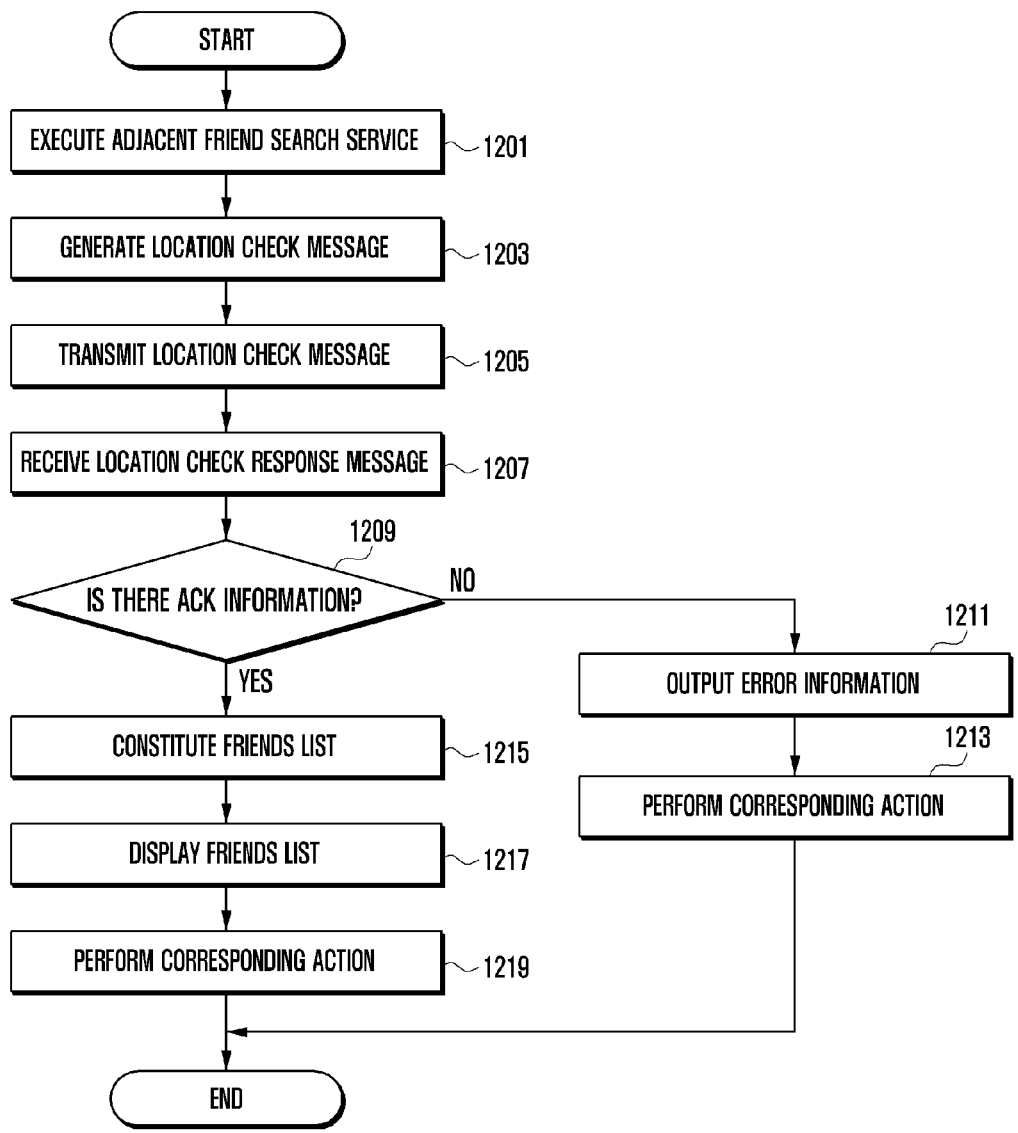
FIG. 10 is a flowchart illustrating a control method when a portable terminal is operated as a sending terminal according to an exemplary embodiment.

FIG. 10 is a flowchart illustrating a control method when a portable terminal is operated as a sending terminal according to an exemplary embodiment.

Referring to FIG. 10, the controller 270 executes an adjacent friend search service according to the user's input (1201). The adjacent friend search service may be executed by a friend search application or selection of a cast function icon. When executing the friend search application, the controller 270 checks the on/off state of the WLAN module 213, and controls to turn-on when the WLAN module 213 when in an off state.

As the friend search application is executed, the controller 270 generates the location check message (1203). Here, the location check message may be a location check message stored in advance in the storage unit 250, or a location check message generated in response to the execution of the friend search application.

The controller 270 transmits the location check message to the contact server 200 through the Wi-Fi network (1205). Further, after transmitting the location check message, the controller 270 may wait for the location check response message corresponding to the location check message.

If the location check response message is received from the contact server 200 after transmitting the location check message (1207), the controller 270 determines whether the location check response message includes ACK information (1209). If the message includes ACK information, the procedure is moved to step 1215, and if the message does not include ACK information (or includes only NACK information), the procedure is moved to step 1211.

When the message does not include ACK information (NO of step 1209), the controller 270 controls an output of error information (1211). The controller 270 visualizes information indicating that there is no friend adjacent to the user, and may provide feedback through the display unit 230. Further, after outputting the error information, the controller 270 controls execution of a corresponding operation according to the user's request (1213). For example, an operation for the adjacent friend search service may be re-executed in response to the user's request, and a function before the adjacent friend search service may be executed.

When including ACK information (YES of step 1209), the controller 270 controls the configuration of the friends list (1215). The controller 270 may constitute the friends list based on ACK information obtained through the location check response message and the identification information of the portable terminal corresponding to ACK information. When constituting the friends list, the controller 270 may consider the location information of the portable terminal corresponding to ACK in formation.

The controller controls a display of the constituted friends list (1217). The controller 270 may visually display the information on one or more friends existing in an adjacent area, and may provide feedback to the user through the screen interface as considered above.

The controller 270 controls the execution of the operation according to the user's input after displaying the friends list (1219). For example, when checking the list of friends existing in an adjacent area, the user may select data intended to be shared with one or more friends, and input casting of the selected data. In response to the user's input, the controller 270 may transmit (or stream) the selected data to one or more other portable terminals through the WLAN link.

Figure 11:
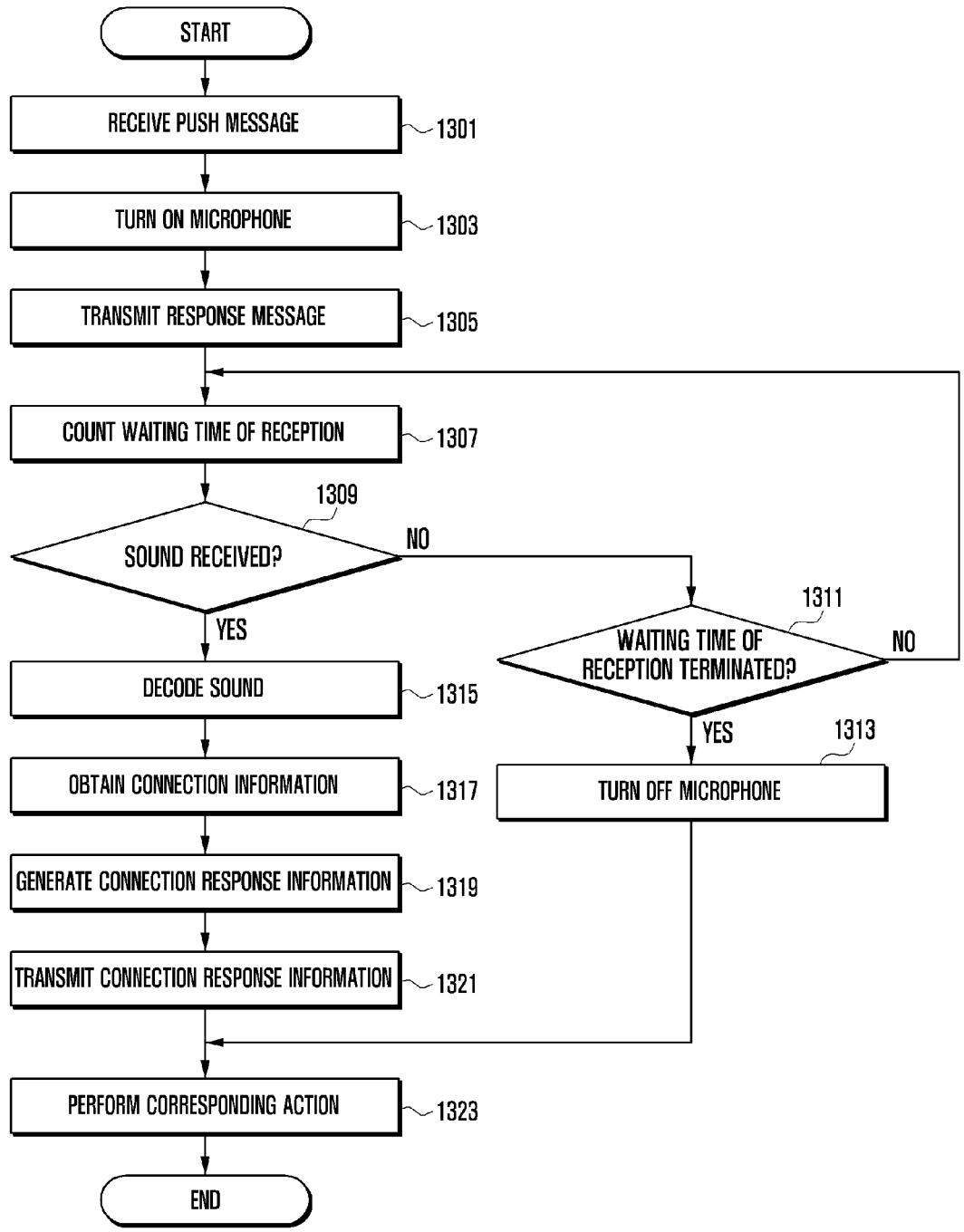
FIG. 11 is a flowchart illustrating a control method when a portable terminal is operated as a receiving terminal according to an exemplary embodiment.

FIG. 11 is a flowchart illustrating a control method when a portable terminal is operated as a receiving terminal according to an exemplary embodiment.

Referring to FIG. 11, if a push message is received from the contact server 200 (1301), the controller 270 controls the turn-on of the microphone 243 (1303).

When turning on the microphone 243, the controller transmits the response message corresponding to the push message to the contact server 200 through the Wi-Fi network (1305). Further, the controller 270 initiates the counting of the waiting time of reception (1307). Here, the waiting time of reception represents time for waiting for an input of a sound outputted in a portable terminal having requested an adjacent friend search service, and the waiting time may be set in various values according to the user's input.

The controller 270 checks whether the sound has been received (1309). The controller 270 may check whether the sound has been inputted through the microphone 243, and determine whether the inputted sound includes the connection information. If the connection information is obtained through the sound, the procedure is moved to step 1315, and if the connection information is not obtained through the sound, the procedure is moved to step 1311.

When the sound is not received (NO of step 1309), the controller 270 checks whether the waiting time of reception has been terminated (1311). If the waiting time of reception has not been terminated (NO of step 1311), the procedure is moved to step 1307, and the controller controls execution of the operation below. If the waiting time of reception has been terminated (YES of step 1311), the controller 270 controls the turn-off of the microphone 243 (1313).

When the sound is received (YES of step 1309), the controller 270 decodes the sound (1315), and obtains the connection information (1317). If the sound including the connection information is inputted through the microphone 243, the controller 270 may obtain connection information loaded in the sound through the decoding of the sound.

The controller 270 generates the connection response information corresponding to the connection information (1319), and transmits the connection response information to the portable terminal having transmitted the sound through the cellular network (1321). The controller 270 may distinguish the portable terminal having transmitted the sound from the identification information of the portable terminal obtained when the push message is received.

After transmitting the connection response information, the controller 270 controls execution of the operation (1323).

For example, after transmitting the connection response information, when data transmitted (streamed) by other portable terminals is received through the wireless LAN (WLAN), the controller 270 may replay the received data.

Figure 12:
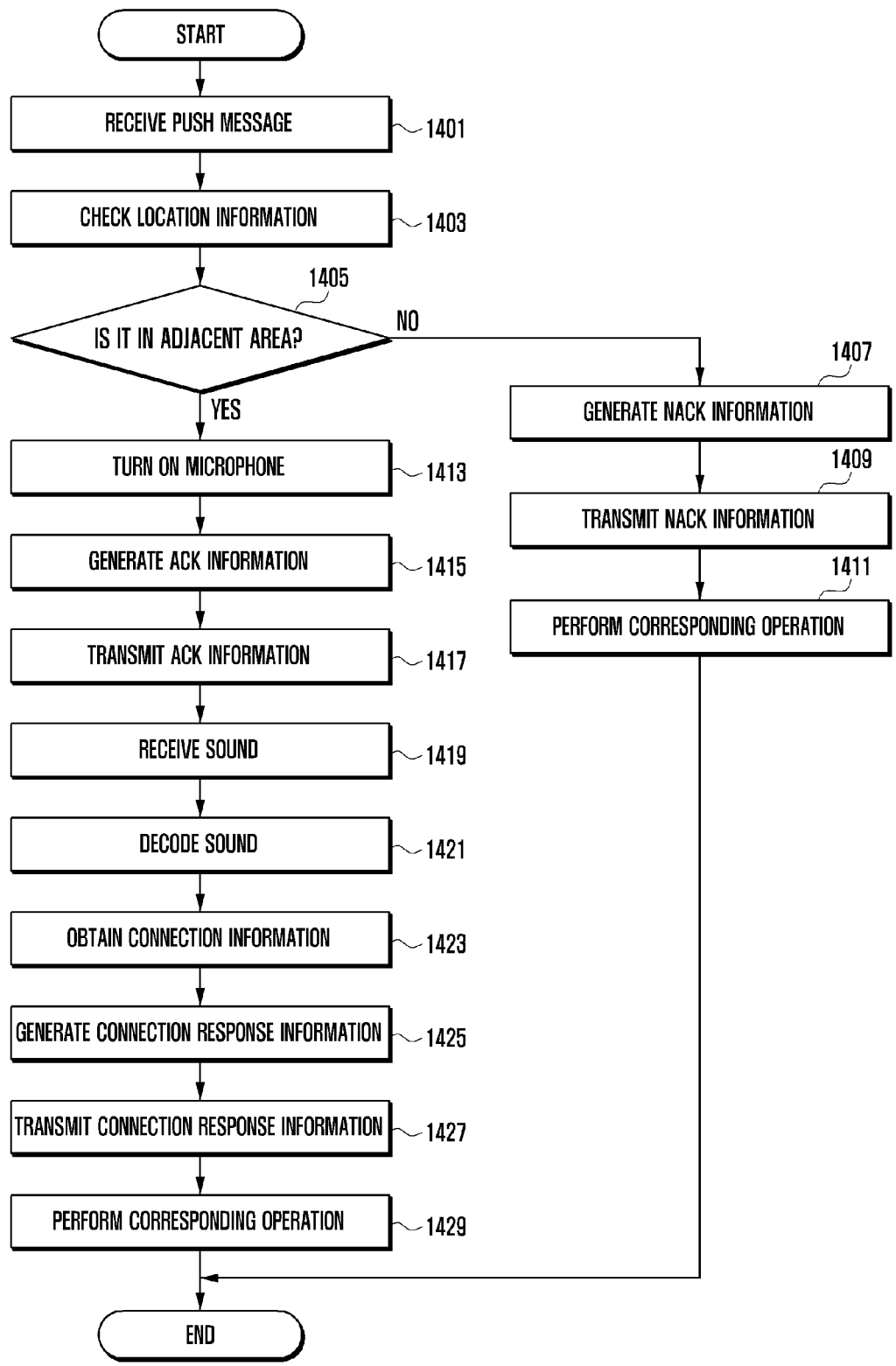
FIG. 12 is a flowchart illustrating another control method when a portable terminal is operated as a receiving terminal according to an exemplary embodiment.

FIG. 12 is a flowchart illustrating another control method when a portable terminal is operated as a receiving terminal according to an exemplary embodiment.

Referring to FIG. 12, if a push message is received from the contact server 200 (1401), the controller 270 checks the location information (1403). When the push message is received from the contact server 200, the controller 270 may check the location of the first portable terminal from the location information of the first portable terminal 100 included in the push message.

The controller 270 determines whether the portable terminal is in an adjacent area corresponding to the location information of the push message through the checking of the location information (1405). For example, the controller 270 may compare the location of the first portable terminal 100 with the location of the second portable terminal 300 to which the controller 270 belongs, and determine whether the second portable terminal 300 exists in a location corresponding to the location of the first portable terminal 100 (e.g., within the coverage of the same base station). If the portable terminal is not in the adjacent area corresponding to the location of the push message, the procedure is moved to step 1407, and if the portable terminal is in the adjacent area corresponding to the location information of the push message, the procedure is moved to step 1413.

If it is determined that the portable terminal is in an area other that the adjacent area (NO of step 1405), the controller 270 generates NACK information (1407), and transmits the response message including NACK information to the contact server 200 (1409).

After transmitting the response message, the controller controls execution of the operation (1411). For example, the controller 270 may notify the fact that the push message according to the adjacent friend search service has been received from the contact server 200. At this time, the controller 270 may provide user information on the user having requested the adjacent friend search service and information indicating non-acceptance of the adjacent friend search service as a pop-up window, etc.

If it is determined that the portable terminal is in an adjacent area (YES of step 1405), the controller 270 controls the turn-on of the microphone 243 (1413). After turning on the microphone 243, the controller 270 generates ACK information (1415), and transmits the response message including ACK information to the contact server 200 (1417).

After transmitting the response message, the controller 270 receives the sound outputted from other portable terminals (1419). After transmitting the response message, the controller 270 may receive the sound from the portable terminal having requested the adjacent friend search service while waiting for the sound through the microphone 243.

When the sound is received, the controller 270 may decode the sound (1421) and obtain the connection information (1423). The controller 270 generates the connection response information corresponding to the connection information (1425), and transmits the connection response information to the portable terminal having transmitted the sound through the cellular network (1427). After transmitting the connection response information, the controller 270 controls execution of the operation (1429). For example, when data transmitted (streamed) by another portable terminal is received through the wireless LAN link, the received data may be replayed.

Figure 13:
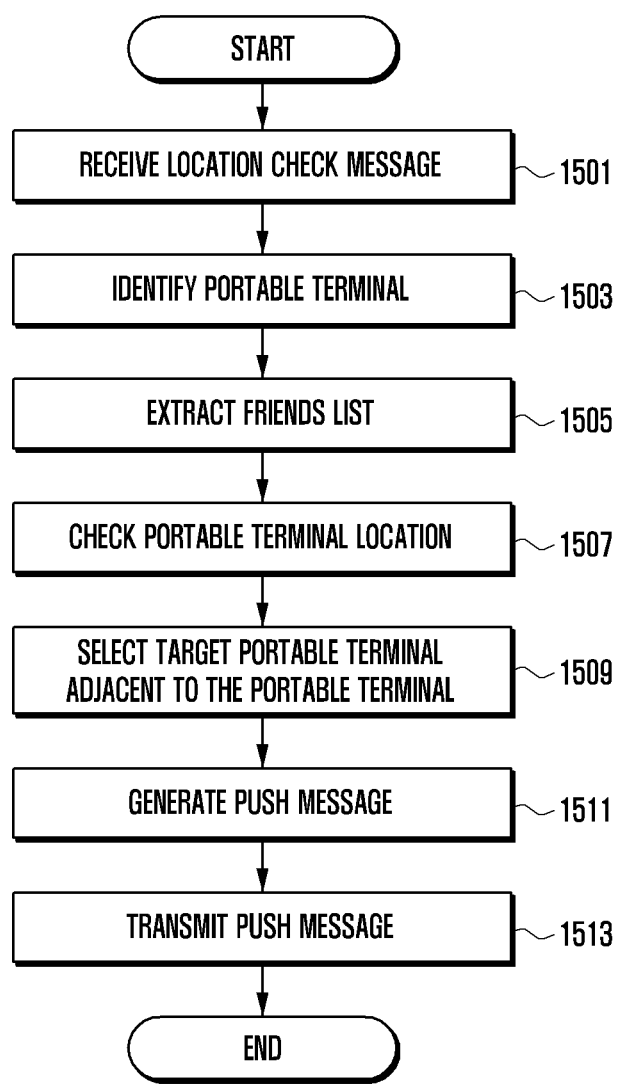
FIG. 13 is a flowchart illustrating a control method of supporting a friend search service in a contact server according to an exemplary embodiment.

FIG. 13 is a flowchart illustrating a control method of supporting a friend search service in a contact server according to an exemplary embodiment.

Referring to FIG. 13, when receiving the location check message (1501), the contact server 200 identifies the portable terminal having transmitted the location check message (1503). When receiving the location check message, the contact server 200 may identify the portable terminal based on the identification information included in the location check message.

The contact server 200 extracts the list of friends related to the user of the sending portable terminal based on the identification information of the sending portable terminal (1505). The friends list may be constituted based on the user information which has been registered in advance in the contact server 200 by the user of the portable terminal.

The contact server 200 checks the location of the sending portable terminal (1507). The contact server 200 may check the location of the sending portable terminal from the location information included in the location check message, or location of the sending portable terminal by identifying the network to which the sending portable terminal belongs.

The contact server 200 selects the target portable terminal adjacent to the sending portable terminal from the friends list (1509). The contact server 200 may select the target portable terminal existing in the location (e.g., within the coverage of the same base station) corresponding to the current location of the sending portable terminal in the list of friends related to the user of the sending portable terminal.

The contact server 200 generates the push message (1511), and transmits the push message to the selected target portable terminal (1513). The contact server 200 may generate a push message of requesting the target portable terminal to wait for the reception of the sound outputted by the sending portable terminal according to the adjacent friend search service. The push message may include message type information, identification information of the sending portable terminal, and location information of the sending portable terminal, etc. The push message may be pushed to the target portable terminal in a push mechanism by the contact server 200 and the push mechanism is well known to those skilled in the art in the communication field, and thus the detailed description thereof will be omitted here.

Figure 14:
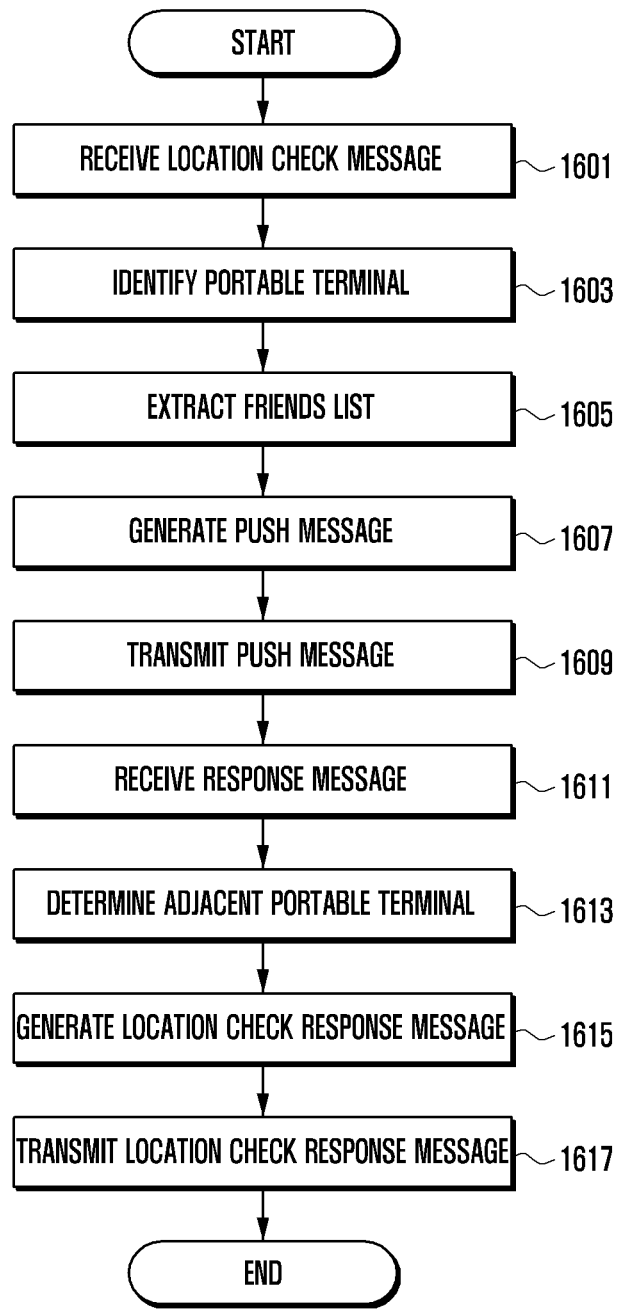
FIG. 14 is a flowchart illustrating another control method of supporting a friend search service in a contact server according to an exemplary embodiment.

FIG. 14 is a flowchart illustrating another control method of supporting a friend search service in a contact server according to an exemplary embodiment.

Referring to FIG. 14, when receiving the location check message (1601), the contact server 200 identifies the sending portable terminal having transmitted the location check message (1603). The contact server 200 extracts the friends list of the sending portable terminal (1605). Further, the contact server 200 generates the push message (1607), and transmits the push message to the target portable terminal corresponding to the list of friends (1609).

The contact server 200 receives a response message corresponding to the push message from the target portable terminal (1611). The response message may include ACK information or NACK information indicating whether the portable terminal exists in an area adjacent to the sending portable terminal.

The contact server 200 determines the portable terminal in an area adjacent to the sending portable terminal through the response message (1613). The contact server 200 may distinguish the portable terminal existing in an area adjacent to the sending portable terminal through ACK information or NACK information included in the response message.

The contact server 200 generates the location check response message (1615), and transmits the location check response message to the sending portable terminal (1617). The location check response message may include identification information of the target portable terminal existing in an area adjacent to the sending portable terminal, or ACK information or NACK information of the target portable terminal.

Figure 15:
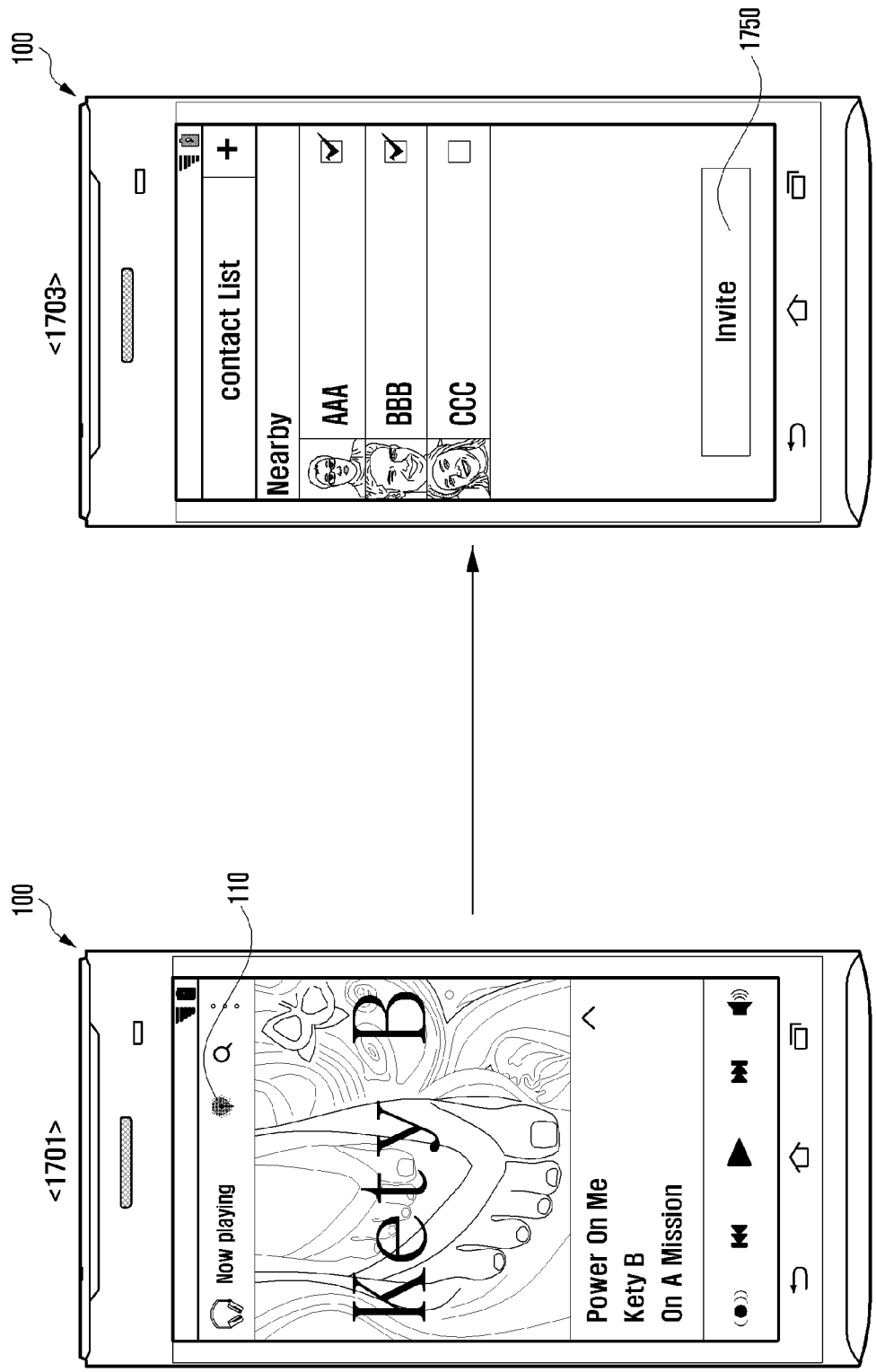
FIGS. 15 and 16 illustrate a screen of connection operation between portable terminals and a screen of mutually connected portable terminals according to a friend search service according to an exemplary embodiment.
Figure 16:
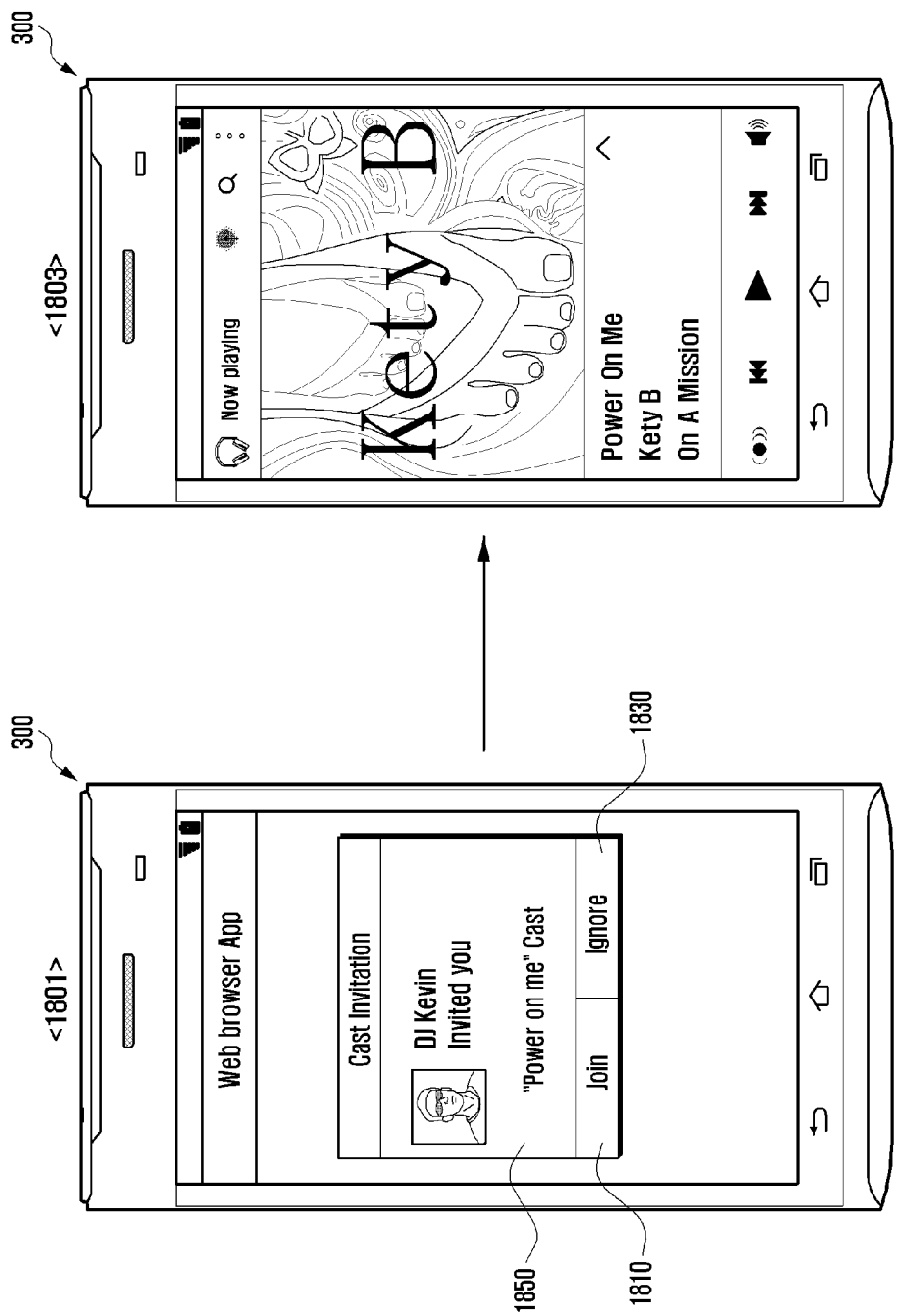

FIGS. 15 and 16 illustrate a screen related to a connection operation between portable terminals and a screen of mutually connected portable terminals according to a friend search service according to an exemplary embodiment.

Referring to FIGS. 15 and 16, the portable terminal of reference numeral 100 of FIG. 15 represents the sending portable terminal, which requests the adjacent friend search service, and the portable terminal of reference numeral 300 of FIG. 16 represents a target portable terminal which turns on the microphone in response to the adjacent friend search service of the sending portable terminal and receives the output sound of the sending portable terminal 100. There may be two or more target portable terminals 300, and the number of the target portable terminals 300 is not limited to a certain number.

As illustrated in reference number 1701 of FIG. 15, the user (e.g., Kevin) of the sending portable terminal 100 may replay and hear music using the music replay application installed in the sending portable terminal 100. Here, the music replay application may perform a cast function according to an exemplary embodiment. As shown in FIG. 15, the cast function icon 110 for the adjacent friend search service is displayed in the screen of the music replay application. FIG. 15 displays the icon, but a button or a text message may also be displayed depending on the implemented method.

While replaying music, if the user of the sending portable terminal 100 selects (e.g., touches) the cast function icon 110 to share the music file being replayed with friends, the location of the target portable terminal 300 may be checked and the feedback may be outputted according to an exemplary embodiment. For example, as illustrated in reference numeral 1703 of FIG. 15, the friends list containing information about the user of the target portable terminal 300 in an area adjacent to user of the sending portable terminal 100 may be visually displayed through the display unit 230.

As illustrated in reference numeral 1703 of FIG. 15, the user of the sending portable terminal 100 may select the user (e.g., AAA, BBB and CCC) of one or more target portable terminals 300 from the friends list. Further, the user of the sending portable terminal 100 may generate a user input to the <Invite> button 1750 in order to transmit (or stream) the music file to the target portable terminal 300 corresponding to the selected users through the wireless LAN. For example, the <Invite> button 1750 may be touched.

In response to the user input, the sending portable terminal 100 may transmit (or stream) the music file to the target portable terminal 300 corresponding to the selected users (e.g., AAA, BBB and CCC) through the wireless LAN.

Further, if the music file is transmitted (or streamed) from the sending portable terminal 100, the target portable terminal 300 displays a pop-up window of showing a selection menu 1850 asking whether to receive and replay the music file of the sending portable terminal 100. That is, the menu of determining whether to accept the invitation of the sending portable terminal 100 may be displayed. At this time, the sending portable terminal 100 and the target portable terminal 300 have registered each other's user information (e.g., the contact number, user's name, etc.), and thus when an invitation from the sending portable terminal 100 is requested, the target portable terminal 300 outputs user information of the sending portable terminal, and the user of the target portable terminal 300 may recognize that the user having requested the invitation is the user (e.g., Kevin) of the sending portable terminal through the outputted user information. Further, the sending portable terminal may also provide metadata (e.g. information indicating that the content intended to be transmitted (or streamed) by the sending portable terminal 100 is a document file) for identifying the content at the time of requesting an invitation to the target portable terminal. Hence, if an invitation is requested from the sending portable terminal 100, the target portable terminal 300 may display a selection menu 1850 including <Join> button 1810 and <Ignore> button 1830, etc. for determining user information (e.g., Kevin), content information and whether to accept the invention as a pop-up window. The number and type of the items provided through the selection menu 1850 as illustrated in reference numeral 1801 of FIG. 16 may be changed according to the implementation method.

Further, if the user selects the <Join> button 1810 from the selection menu, the target portable terminal 300 may receive and display the music file transmitted (or streamed) by the sending portable terminal 100 as illustrated in reference numeral 1803 of FIG. 16. That is, if user selects <Join> button 1810 from the selection menu 1850, the target portable terminal 300 may perform conversion and display a screen of replaying the music file corresponding to the screen displayed in the sending portable terminal 100 as illustrated in reference numeral 1803 of FIG. 16.

Here, when selecting <Join> button 1810 of the user, the target portable terminal 300 may form a wireless LAN (WLAN) link with the sending portable terminal 100. At this time, if the WLAN function is in a deactivated state, the target portable terminal 300 may convert the state of the WLAN function into an activated state, then form a WLAN link, and then receive and replay the music file transmitted (or streamed) from the sending portable terminal 100. That is, if a WLAN link is formed between the sending portable terminal 100 and the target portable terminal 300, the sending portable terminal 100 may transmit (or stream) the music file to the target portable terminal 300 through the WLAN.

If the user selects (e.g., touches) the <Ignore> button 1830 from the selection menu, the target portable terminal 300 may return to the function having been executed, and display the screen (e.g., the home screen). Here, when <Ignore> button 1830 is selected, the target portable terminal 300 may transmit a rejection message of rejecting the invitation to the sending portable terminal 100.

The foregoing exemplary embodiments may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the exemplary embodiments or be known to a person having ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, flash memory storing and executing program commands. Further, the program command includes a machine language code created by a complier and a high-level language code executable by a computer using an interpreter. The foregoing hardware device may be configured to be operated as at least one software module to perform an operation of the present invention, and vice versa.

Although exemplary embodiments have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of providing a friend search service of a terminal, the method comprising:
transmitting, by a first terminal, a message for controlling a microphone of a second terminal to a server through a network;
outputting a sound including a first encryption key after transmitting the message;
receiving a second encryption key from the second terminal through the network;
checking second terminals existing in a sound-reaching area by comparing the first encryption key with the second encryption key; and
displaying a friends list including the second terminals existing in the sound-reaching area.

2. The method of claim 1, wherein the outputting further comprises determining an output intensity of the sound including the first encryption key, and outputting the sound according to the determined output intensity.

3. The method of claim 1, wherein the displaying comprises listing and displaying the second terminals according to distance order.

4. The method of claim 3, wherein the displaying comprises distinguishing adjacent users from non-adjacent users based on user information of the second terminals, and listing and displaying the distinguished users in different areas.

5. The method of claim 3, wherein the displaying comprises graphically arranging and displaying location information of the second terminals by distances and direction information of locations of the second terminals.

6. The method of claim 1, further comprising:
forming a wireless local area network (WLAN) link between the first terminal and the second terminals,
wherein the first terminal transmits contents to the second portable terminals in which the WLAN link has been formed.

7. The method of claim 1, wherein at least one from among the first terminal and the second terminal is portable.

8. A method of providing a friend search service of a terminal, the method comprising:
receiving, by a second terminal, a message for controlling a microphone from a server through a network;
turning on the microphone of the second terminal in response to the message;
receiving a sound outputted by a first terminal through the microphone;
obtaining an encryption key from the sound; and
transmitting the encryption key to the first terminal through the network.

9. The method of claim 8, wherein the turning on of the microphone turns on the microphone in response to message type information of the received message.

10. The method of claim 8, further comprising:
returning a response message corresponding to the turning on of the microphone in the second terminal, to the first portable terminal.

11. The method of claim 8, further comprising:
forming a wireless local area network (WLAN) between the first terminal and the second terminal; and
receiving contents from the first terminal in which the WLAN is formed.

12. The method of claim 8, wherein the message is a push message.

13. A method of providing a friend search service of a server, the method comprising:
constituting a friends list of a first terminal in response to execution of a friend search service of the first terminal;
generating a message for controlling a turning-on of a microphone of a second terminal corresponding to the friends list;
pushing the message to the second terminal through a network;
receiving an encryption key through the network from the second terminal having received the message; and
transmitting the encryption key to the first terminal through the network.

14. The method of claim 13, wherein the friends list is one from among a list of all users having a relationship with a user of the first terminal, and a list of users within a coverage of a base station to which the first terminal belongs among all users having a relationship with the user of the first terminal.

15. The method of claim 13, wherein the constituting the friends list is based on identification information related to the first terminal,
wherein the identification information is registered in the server.

16. A terminal comprising:
a hardware storage media which stores at least one program; and
a controller configured to control a first terminal to search for a second terminal by executing the at least one program,
wherein the at least one program includes commands for executing the operations:
transmitting, by the first terminal, a message for controlling a microphone of the second terminal to a contact server through a network;
outputting a sound including a first encryption key after transmitting the message;
receiving a second encryption key through the network from the second terminal;
checking the second terminal existing in a sound-reaching area by comparing the first encryption key with the second encryption key; and
displaying a friends list including the second terminal existing in the sound-reaching area.

17. The terminal of claim 16, wherein the first terminal outputs the sound to the second terminal according to an output intensity of a sound corresponding to a reaching distance, and the second terminal exists in a reaching range of the sound outputted by the first terminal.

18. The terminal of claim 17, wherein the controller controls transmission of the message for controlling the microphone of the second terminal, controls an output of the sound including the encryption key, distinguishes the friends list including the second terminal existing in the sound-reaching area by distances by comparing the encryption key received from the second terminal with the encryption key transmitted via the sound, and controls a display of the friends list.

19. The terminal of claim 17, wherein the first terminal forms a wireless local area network (WLAN) with the second terminal, and transmits contents to the second terminal through the WLAN.

20. A terminal comprising:
a hardware storage media which stores at least one program; and
a controller configured to control a first terminal to search for a second terminal by executing the at least one program,
wherein the at least one program includes commands for executing the operations:
  receiving, by the second terminal, a message for controlling a microphone from a server through a network in a scheme;
  turning on the microphone of the second terminal in response to the message;
  receiving a sound outputted by the first terminal through the microphone;
  obtaining an encryption key from the sound; and
  transmitting the encryption key to the first terminal through the network.

21. The terminal of claim 20, wherein the controller controls turning-on of the microphone when receiving the message, and controls to extract the encryption key from the sound inputted through the microphone and transmit the extracted encryption key to the first terminal.

22. The terminal of claim 21, wherein the controller checks whether the message exists in a sound-reaching area of the first terminal when receiving the message, turns on the microphone when the message exists in the sound-reaching area of the first terminal, and controls waiting for the sound outputted in the first terminal.

23. The terminal of claim 21, wherein the second terminal forms a wireless local area network (WLAN) with the first terminal, and receives contents from the first terminal through the WLAN.

24. A computer-readable recording medium for recording a program executing instructions, the instructions comprising outputting a sound including an encryption key through a speaker when executing a friend search service, identifying a friend in a sound-reaching area based on a terminal responding to the sound and providing a feedback to a user, receiving the sound outputted from the speaker through a microphone, and informing of existence in a sound-reaching area by transmitting the encryption key obtained from the sound.

* * * * *